(12) United States Patent
Wang et al.

(10) Patent No.: US 8,765,360 B2
(45) Date of Patent: *Jul. 1, 2014

(54) OPTICAL FILMS AND METHODS OF MAKING THE SAME

(75) Inventors: Jian Jim Wang, Orefield, PA (US);
Xuegong Deng, Piscataway, NJ (US);
Anguel N. Nikolov, Bridgewater, NJ (US)

(73) Assignee: Polarization Solutions, LLC, Somerset, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 12/964,646

(22) Filed: Dec. 9, 2010

(65) Prior Publication Data

US 2011/0279900 A1    Nov. 17, 2011

Related U.S. Application Data

(63) Continuation of application No. 10/866,416, filed on Jun. 11, 2004, now abandoned.

(60) Provisional application No. 60/562,890, filed on Apr. 15, 2004.

(51) Int. Cl.
*G02B 5/18* (2006.01)
*C23C 16/00* (2006.01)
*G02B 1/11* (2006.01)

(52) U.S. Cl.
CPC ............ *G02B 5/18* (2013.01); *G02B 5/1809* (2013.01); *G02B 5/1866* (2013.01); *G02B 1/118* (2013.01)
USPC ........... 430/321; 359/494; 359/495; 359/497; 359/566; 359/569; 359/571; 359/574; 359/575; 359/586; 359/576

(58) Field of Classification Search
None
See application file for complete search history.

(56) References Cited

U.S. PATENT DOCUMENTS

| | | |
|---|---|---|
| 4,009,933 A | 3/1977 | Firester |
| 4,289,381 A | 9/1981 | Garvin |
| 4,385,975 A | 5/1983 | Chu et al. |
| 4,688,897 A | 8/1987 | Grinberg et al. |
| 4,856,857 A * | 8/1989 | Takeuchi et al. ............ 283/86 |
| 5,119,231 A | 6/1992 | Nelson et al. |
| 5,196,953 A | 3/1993 | Yeh et al. |
| 5,245,471 A | 9/1993 | Iwatsuka et al. |
| 5,282,121 A | 1/1994 | Bornhorst et al. |

(Continued)

FOREIGN PATENT DOCUMENTS

| | | |
|---|---|---|
| CN | 1292431 | 4/2001 |
| DE | 3412958 | 10/1985 |

(Continued)

OTHER PUBLICATIONS

Yu et al., "Fabrication of large area 100 nm pitch grating by spatial frequency doubling and nanoimprint lithography for subwavelength optical applications" J Vac. Sci. Technol. B vol. 19(6) pp. 2816-2819 (Nov. 12, 2001).*

(Continued)

*Primary Examiner* — Martin Angebranndt
(74) *Attorney, Agent, or Firm* — Onello & Mello, LLP

(57) ABSTRACT

Films for optical use, articles containing such films, methods for making such films, and systems that utilize such films, are disclosed.

20 Claims, 8 Drawing Sheets

(56) References Cited

U.S. PATENT DOCUMENTS

| | | | |
|---|---|---|---|
| 5,375,012 A | 12/1994 | Borrelli et al. | |
| 5,377,044 A | 12/1994 | Tomono et al. | |
| 5,383,053 A | 1/1995 | Hegg et al. | |
| 5,458,084 A | 10/1995 | Thorne et al. | |
| 5,504,603 A | 4/1996 | Winkler et al. | |
| 5,638,197 A | 6/1997 | Gunning et al. | |
| 5,748,368 A | 5/1998 | Tamada et al. | |
| 5,772,905 A | 6/1998 | Chou | |
| 5,851,849 A | 12/1998 | Comizzoli et al. | |
| 5,852,688 A | 12/1998 | Brinkman et al. | |
| 6,020,944 A | 2/2000 | Hoshi | |
| 6,057,901 A | 5/2000 | Xu | |
| 6,122,103 A | 9/2000 | Perkins | |
| 6,185,019 B1 | 2/2001 | Hobbs et al. | |
| 6,208,463 B1 | 3/2001 | Hansen et al. | |
| 6,234,634 B1 | 5/2001 | Hansen et al. | |
| 6,243,199 B1 | 6/2001 | Hansen et al. | |
| 6,288,840 B1 | 9/2001 | Perkins et al. | |
| 6,375,870 B1 | 4/2002 | Visovsky et al. | |
| 6,447,120 B1 | 9/2002 | Hansen et al. | |
| 6,519,016 B1 | 2/2003 | Ichihashi et al. | |
| 6,563,582 B1 | 5/2003 | Chun | |
| 6,576,053 B1 | 6/2003 | Kim et al. | |
| 6,585,378 B2 | 7/2003 | Kurtz et al. | |
| 6,613,695 B2 | 9/2003 | Pomarede et al. | |
| 6,618,104 B1 | 9/2003 | Date et al. | |
| 6,661,952 B2 | 12/2003 | Simpson et al. | |
| 6,692,797 B1 | 2/2004 | Owen et al. | |
| 6,785,050 B2 | 8/2004 | Lines et al. | |
| 6,795,231 B1 | 9/2004 | Koscielniak | |
| 6,805,445 B2 | 10/2004 | Silverstein et al. | |
| 6,906,782 B2 | 6/2005 | Nishi | |
| 6,909,473 B2 | 6/2005 | Mi et al. | |
| 6,947,215 B2 | 9/2005 | Hoshi | |
| 7,142,375 B2 * | 11/2006 | Nikolov et al. | 359/722 |
| 7,203,001 B2 | 4/2007 | Deng et al. | |
| 7,294,360 B2 | 11/2007 | Maula et al. | |
| 7,405,880 B2 * | 7/2008 | Nikolov et al. | 359/589 |
| 7,619,816 B2 | 11/2009 | Deng et al. | |
| 7,670,758 B2 | 3/2010 | Wang et al. | |
| 2001/0051443 A1 | 12/2001 | Koo | |
| 2002/0003664 A1 | 1/2002 | Mearini et al. | |
| 2002/0012172 A1 | 1/2002 | Steinberg et al. | |
| 2002/0191880 A1 | 12/2002 | Borrelli et al. | |
| 2003/0022425 A1 | 1/2003 | Tungare | |
| 2003/0026575 A1 | 2/2003 | Lempkowski | |
| 2003/0156325 A1 | 8/2003 | Hoshi | |
| 2003/0227597 A1 | 12/2003 | Silverstein et al. | |
| 2004/0036961 A1 | 2/2004 | McGuire | |
| 2004/0043149 A1 | 3/2004 | Gordon et al. | |
| 2004/0197527 A1 * | 10/2004 | Maula et al. | 428/172 |
| 2004/0208994 A1 | 10/2004 | Harkonen et al. | |
| 2004/0218270 A1 | 11/2004 | Wang | |
| 2005/0045799 A1 | 3/2005 | Deng et al. | |
| 2005/0181128 A1 | 8/2005 | Nikolov | |
| 2005/0275944 A1 | 12/2005 | Wang et al. | |
| 2005/0277063 A1 | 12/2005 | Wang et al. | |
| 2006/0001969 A1 | 1/2006 | Wang et al. | |
| 2006/0049056 A1 * | 3/2006 | Wang et al. | 205/123 |
| 2006/0127829 A1 | 6/2006 | Deng et al. | |
| 2006/0127830 A1 | 6/2006 | Deng et al. | |
| 2007/0139771 A1 * | 6/2007 | Wang et al. | 359/494 |
| 2007/0165308 A1 * | 7/2007 | Wang et al. | 359/494 |
| 2007/0264424 A1 * | 11/2007 | Wang | 427/162 |
| 2009/0041971 A1 * | 2/2009 | Wang et al. | 428/54 |
| 2009/0053655 A1 * | 2/2009 | Deng et al. | 430/321 |
| 2010/0265571 A1 * | 10/2010 | Wang et al. | 359/352 |
| 2011/0076456 A1 * | 3/2011 | Wang | 428/164 |

FOREIGN PATENT DOCUMENTS

| | | |
|---|---|---|
| DE | 10049257 | 4/2001 |
| EP | 1103829 | 12/2009 |
| GB | 2355727 | 5/2001 |
| JP | 02-230203 | 9/1990 |
| JP | 07-005316 | 1/1995 |
| JP | 07-250727 | 10/1995 |
| JP | 09-090122 | 4/1997 |
| JP | 11-014814 | 1/1999 |
| JP | 2000-284117 | 10/2000 |
| JP | 2003-066229 | 3/2003 |
| WO | 99/18458 | 4/1999 |

OTHER PUBLICATIONS

Yu et al., Synthesis of polarization selective components with multilayer subwavelength structures Proc. SPIE vol. 5183, pp. 184-191 (Aug. 2003).*

Kanamori et al. "Broadband antireflection subwavelength gratings for polymethyl methacrylate fabricated with molding techniques" Opt. Rev. vol. 9(5) pp. 183-185 (2002).*

DeGuzman et al., "Stacked subwavelgnth gratings as cicular polarization filters", Appl. Opt., vol. 40(31) 5731-5737 (Nov. 2001).*

Deng et al., "Fabrication and properties of visible light subwavelgnth amorphous silicon transmission gratings", J. Vac. Sci. TEchnol. B., vol. 13(6) pp. 2879-2882 (Nov. 12, 1995).*

Li et al, "All dielectric high efficiency reflection gratings made with multilayer thin film coatings", Opt. Lett., vol. 20 (11) pp. 1349-1351 (Jun. 1995).

Riihela et al, "Introducing atomic layer epitaxy tfor the deposition of optical thin films", Thin. Sol. Films., vol. 289, pp. 250-255 (1996).

Bokor et al, "Achromatic phase retarder by slanted illumination of a dielectric grating with period comparable with the wavelength." Applied Optics, 40: 13, pp. 2076-2080, May 1, 2001.

Cescato et al, "Holographic quarterwave plates." Applied Optics, 29:22, pp. 3286-3290, Aug. 1, 1990.

Enger et al, "Optical elements with ultrahigh spatial-frequency surface corrugations." Applied Optics, 22:20, pp. 3220-3228, Oct. 15, 1983.

Flanders, D.C., "Submicrometer periodicity gratings as artificial anisotropic dielectrics." Appl. Phys. Lett., 42:6, pp. 492-494, Mar. 15, 1983.

Guo, L. J., "Recent progress in nanoimprint technology and its applications." Journal of Physics D: Applied Physics. 37,pp. R123-RI41, 2004.

Hausmann et al, "Rapid Vapor Deposition of Highly Conformal Silica Nanolaminates." Science. 298, pp. 402-406, Oct. 11, 2002.

Kikuta et al, "Archromatic quarter-wave plates using the dispersion ofform birefringence." Applied Optics. 36:7, pp. 1566-1572, Mar. 1, 1997.

Lugmair et al, "New Tris (tert-butoxy)silixy Complexes of Aluminum and Their Transformation to Homogeneous Aluminosilicate Materials via Low-Temperature Thermolytic Pathways." Chern. Mater., 14, pp. 888-898, 2002.

Tyan et al, "Design, fabrication, and characterization of form-birefringent multilayer polarizing beam splitter." J. Opt. Soc. Am. A,14:7, pp. 1627-1636, Jul. 1997.

Tyan et al, "Polarizing beam splitter based on the anisotropic spectral relectivity characteristic of form-birefringent multiplayer gratings." Optics Letters, 21: 10,761-763, May 15, 1996.

Tyan et al, "Subwavelength Multilayer Binary Grating Design for Implementing Photonic Crystals." OSA Tech Digest Series, 9, Topical Meeting on Quantum Optoelectronics, 1997.

Colburn, M. et al, "Step and Flash Imprint Lithography: A New Approach to High Resolution Patterning", Proc. SPIE, (Mar. 1999) vol. 3676, pp. 379-389., see pp. 379-380 in particular.

Kim et al, "Design of a grating-based thin-film filter for broadband spectropolarmetry", Applied Optics, vol. 42, No. 31, pp. 6321-6326, Nov. 1, 2003.

Sato et al, "Fabrication Techniques and Characteristics of Al-Si02 Laminated Optical Polarizers", IEEE Journal of Quantum Electronics, vol. 29, No. 1, pp. 175-181, Jan. 1993.

Stockley et al, "High-speed analog achromatic intensity modulator", Optical Society of America-Dptical Letters, vol. 19, No. 10, pp. 758-760, May 15, 1994.

(56) References Cited

OTHER PUBLICATIONS

Buhrer, C., "Four waveplate dual tuner for birefringent filters and multiplexers", Applied Optics, vol. 26, No. 17, pp. 3628-3632, Sep. 1, 1987.
Gu et al, "Form birefringence dispersion in periodic layered media", Optical Society of America-Optical Letters, vol. 21, No. 7, pp. 504-506, Apr. 1, 1996.
Boulbry et al, "Polarization errors associated with zero-order achromatic quarter-wave plates in the whole visible spectral range" Optics Express, vol. 9, No. 5, pp. 225-235.
Nordin et al, "Broadband form birefringent quarter-wave plate of the mid-infrared wavelength region", Optics Express, vol. 5, No. 8, pp. 163-168, Oct. 11, 1999.
Masterson et al, "Novel Polarization Interference Filters for Wide Spectral Tuning of an Optical Null", Boulder Nonlinear Systems, 450 Courtney Way, Lafayette Colorado 80026.
Kitagawa et al, "Form birefringence of SiO2 ITa2 0 5 periodic multilayers", Applied Optics, vol. 24, No. 20, pp. 3359-3362, Oct. 15, 1985.
Pancharatnam, "Achromatic Combinations of Birefringent Plates-PartH. An Achromatic Quarter-Wave Plate", Memoir No. 71 of the Raman Research Institute, Bangalore, pp. 137-144, Mar. 5, 1955.
Wang et al, "High-performance optical retarders based on all-dielectric immersion nanogratings", Optical Society of America-Dptical Letters, vol. 30, No. 14, pp. 1864-1866, Jul. 15, 2005.
Deng et al, "Achromatic wave plates for optical pickup units fabricated by use of imprint lithography", Optical Society of America-Optical Letters, vol. 30, No. 19, pp. 2616-2616, Oct. 1, 2005.
Kleemann et al, "Area-coded effective medium structures, a new type of grating design", Optical Society of America-Dptical Letters, vol. 30, No. 13, pp. 1617-1619, Jul. 1, 2005.
Wang et al, "High-performance nanowire-grid polarizers", Optical Society of America-Optical Letters, vol. 30, No. 2, pp. 195-197, Jan. 15, 2005.
Wang et al, "Monolithically Integrated Isolators Based on Nanowire-Grid Polarizers", IEEE Photonics Technology Letters, vol. 17, No. 2, pp. 396-398, Feb. 2005.
Suleski et al, "Fabrication Trends for Free-Space Microoptics", Journal of Lightwave Technology, vol. 23, No. 2, Feb. 2005.
Shareef et al, "Subatomospheric chemical vapor deposition ozone/TEOS process for SiO2 trench filling", American Vacuum Society, Jul./Aug. 1995.
Rey et al, "Monte Carlo low pressure deposition profile simulations", American Vacuum Society, May/Jun. 1991.
Lutze et al, "Spin-on-glass for 200nm trench isolation structures", J.Micromech. Microeng, pp. 46-51, (1991).
Lu et al, "Trench filling by ionized metal physical vapor deposition", American Vacuum Society, pp. 2652-2663, Sep./Oct. 2001.
Lee et al, "Arbitrary structuring of two-dimensional photonic crystals by use of phase-only Fourier gratings", Optical Society of America, vol. 29, No. 21, Nov. 1, 2004.
Doshi et al, "Optically Defined Multifunctional Patterning of Photo sensitive Thin-Film Silica Mesophases", Science, vol. 290, Oct. 6, 2000.
Zhao et al, "Creation of a three-dimensional optical chain for controllable particle delivery", Optical Society of America-Optical Letters, vol. 30, No. 8, Apr. 15, 2005.
Yeh et al, "Electromagnetic propagation in periodic stratified media. I. General theory", Optical Society of America, vol. 67, No. 4, Apr. 1977.
Xu et al, "Single-substrate birefringent computer-generated holograms", Optical Society of America-Optical Letters, vol. 21, No. 7, Apr. 1, 1996.
Weber et al, "Giant Birefringent Optics in Multilayer Polymer Mirrors", Science, vol. 287, Mar. 31, 2000.
Shiraishi et al, "Experimental verification of a form-birefringent polarization spliter", American Institute of Physics, vol. 58, No. 3, Jan. 21, 1991.
Stork et al, "Artificial distribution-index media fabrication by zeroordergratings." Optical Society of America, vol. 16, No. 24, Dec. 15, 1991.
Sinclair et al, "Synthetic infrared spectra", Optical Society of America-Dptical Letters, vol. 22, No. 13, Jul. 1, 1997.
Shiraishi et al, "Spatial walk-off polarizer utilizing artificial anisotropic dielectrics", Optical Society of America-Dptical Letters, vol. 15, No. 9, May 1, 1990.
Noda et al, "Polarization mode control of two-dimensional photonic crystal laser by unit cell structure design" Science, vol. 293, Aug. 10, 2001.
Nieuborg et al, "Polarization-selective diffractive optical elements with an index-matching gap material", Applied Optics, vol. 36, No. 20, Jul. 10, 1997.
Mirotznik et al, "Design of two-dimensional polarization-selective diffractive optical elements with form-birefringent microstructures", Applied Science, vol. 43, No. 32, Nov. 10, 2004.
Lopez et al, "Wave-plate polarization beam splitter based on a form-birefringent multilayer grating", Optical Society of America, vol. 23, No. 20, Oct. 15, 1998.
Liu et al, "Realization of a polarizer employing the combined effects of birefringence and diffraction", Optical Society of America-Dptical Letters, vol. 22, No. 19, Oct. 1, 1997.
Liu et al, "Multilevel binary phase grating polarization device with a birefringent substrate", Optical Society of America-Dptical Letters, vol. 20, No. 17, Sep. 1, 1995.
Levy et al, "Design, fabrication and characterization of subwavelength computer-generated holograms for spot array generation", Optics Express, vol. 12, No. 22, Nov. 1, 2004.
Leger et al, "Diffractive optical element for mode shaping of a Nd:YAG laser", Optical Society of America-Dptical Letters, vol. 19, No. 2, Jan. 15, 1994.
Felbacq et al, "Left-handed media and homogenization of photonic crystals", Optical Society of America-Dptical Letters, vol. 30, No. 10, May 15, 2005.
Johnson et al, "Phase encryption of biometrics in diffractive optical elements", Optical Society of America-Optical Letters, vol. 21, No. 16, Apr. 15, 1996.
Grann et al, "Artificial uniaxial and biaxial dielectrics with us of two-dimensional subwavelength binary gratings", Optical Society of America, vol. 11, No. 10, Oct. 1994.
Glaser et al, "Beam switching with binary single-order diffractive gratings", Optical Society of America-Optical Letters, vol. 23, No. 4, Dec. 15, 1998.
Deng et al, "Generic three-dimensional wavelength router based on cross connects of multi-layer diffractive elements", Proceeding of SPIE, vol. 4292 (2001).
Deng et al, "Design of cascaded diffractive phase elements for three-dimensional multiwavelength optical interconnects", Optical Society of America-Dptical Letters, vol. 25, No. 14, Jul. 15, 2000.
Chang et al, "Multiple-phase retrieval for optical security systems by use of random-phase encoding", Applied Optics vol. 41, No. 23, Aug. 10, 2002.
Auton, "Infrared transmission polarizers by photolithography", Applied Optics, vol. 6, No. 6, Jul. 1967.
Tamada et al, "Al wire-grid polarizer using the s-polarization resonance effect at the 0.8-flm-wavelenth band", Optical Society of America-Optical Letters, vol. 22, No. 6, Mar. 15, 1997.
Bennett, "Polarizers (Chapter 3 of Handbook of Optics, Edited by Bass et al.)", McGraw-Hill, Inc., ISBN 0-07-047974-7, (1995).
Haggans et al, "Effective-medium theory of zeroth order lamellar gratings in conical mountings", J. Opt. Soc. Am. A, vol. 10, pp. 2217-2225 (1993).
Kikuta et al, "Ability and Limitations of effective medium theory for subwavelength gratings", Opt. Rev., vol. 2, pp. 93-99, (1995).
Gori, "Measuring Stokes parameters by means of a polarization grating", Opt. Lett., vol. 24, No. 9, pp. 584, (1999).
Li, "Multilayer modal method for diffraction gratings of arbitrary profile, depth, and permittivity", J. Opt. Soc. Am. A, vol. 10, No. 12, pp. 2581, (1993).

(56) References Cited

OTHER PUBLICATIONS

Gaylord et al, "Analysis and applications of optical diffraction gratings", Proc. IEEE, vol. 73, No. 5, (1985).

Pezzaniti et al, "Angular dependence of polarizing beam-splitter cubes", Applied Optics vol. 33, Issue 10, pp. 1916-1929, Apr. 1994.

Wang et al, "Fabrication of a new broadband waveguide polarizer with a double-layer 190nm period metal-gratings using nanoimprint lithography", American Vacuum Society, vol. 17, No. 6, Nov./Dec. 1999.

Schnabel et al, "Study on polarizing visible light by sub-wavelengthperiod metal-stripe gratings", Opt. Eng. vol. 38, No. 2, pp. 220-226, Figure 8 and related text, Feb. 1999.

Doumuki et al, "An aluminum-wire grid polarizer fabricated on a gallium-arsenide photodiode", Appl. Phys. Lett. vol. 71, No. 5, pp. 686-688, Figure 2 and related text, Aug. 4, 1997.

Definitions-www.profluxpolarizer.com. pp. 1-2 (1995).

Van Stryland, E.W., et al, "Handbook of Optics, Devices, Measurements & Properties", 3.10 vol. 2, 2nd Ed., (1995).

Griffiths, D.J., "Electromagnetic Waves in Nonconducting Media" Introduction to Electrodynamics, 2nd Ed., p. 363, (1989).

Zaitsu et al, "Optical thin films consisting of nanoscale laminated layers", Appl. Phys. Lett., 80:14, pp. 2442-2444, Apr. 8, 2002.

Kramar, J.A., et al, "Grating pitch measurements with molecular measuring machine", Proc. SPIE, Jul. 1999, vol. 3806, pp. 46-53, particularly p. 48.

\* cited by examiner

OPTICAL FILMS AND METHODS OF MAKING THE SAME

CROSS-REFERENCE TO RELATED APPLICATIONS

This application is a continuation of U.S. application Ser. No. 10/866,416, filed on Jun. 11, 2004, now abandoned, which claims priority under 35 U.S.C. §119 to U.S. Provisional Patent Application Ser. No. 60/562,890, entitled "PRECISION PHASE RETARDERS AND WAVEPLATES AND THE METHOD FOR MAKING THE SAME," and filed on Apr. 15, 2004. The entire contents of those applications are hereby incorporated by reference herein in their entirety.

TECHNICAL FIELD

This invention relates to optical films and related articles, systems and methods.

BACKGROUND

Optical devices and optical systems are commonly used where manipulation of light is desired. Examples of optical devices include lenses, polarizers, optical filters, antireflection films, retarders (e.g., quarter-waveplates), and beam splitters (e.g., polarizing and non-polarizing beam splitters).

SUMMARY

This invention relates to films for optical use, articles containing such films, methods for making such films, and systems that utilize such films.

In a first aspect, the invention features a method that includes providing an article that includes a layer of a first material, wherein the layer of the first material includes at least one trench and wherein the layer is birefringent for light of wavelength $\lambda$ propagating through the layer along an axis, wherein $\lambda$ is between 150 nm and 2,000 nm, and filling at least about 50% of a volume of the trench by sequentially forming a plurality of monolayers of a second material within the trench.

In another aspect, the invention features a method that includes forming a layer of a material on a surface of a grating using atomic layer deposition.

In another aspect, the invention features a method that includes forming an optical retardation film using atomic layer deposition.

In another aspect, the invention features an article, which includes a continuous layer including rows of a first material alternating with rows of a nanolaminate material, wherein the continuous layer is birefringent for light of wavelength $\lambda$ propagating through the continuous layer along an axis, wherein $\lambda$ is between 150 nm and 2,000 nm.

In another aspect, the invention features an article including a form birefringent optical retardation film that includes a nanolaminate material.

Embodiments of the invention can include one or more of the following features.

The filling can further include forming one or more monolayers of a third material within the trench, wherein the second and third materials are different. The monolayers of the second and third materials can form a nanolaminate material. At least about 80% (e.g., at least about 90%, at least about 99%) of the volume of the trench can be filled by sequentially forming the plurality of monolayers of the second material within the trench. The second material can be different from the first material. The layer of the first material and the second material can form a continuous layer. The continuous layer can be birefringent for light of wavelength $\lambda$ propagating through the continuous layer along an axis, wherein $\lambda$ is between 150 nm and 2,000 nm. The article can include additional trenches formed in the surface of the layer of the first material. The method can further include filling at least about 50% of a volume of each of the additional trenches by sequentially forming a plurality of monolayers of the second material within the additional trenches. The method can further include filling at least about 80% (e.g., at least about 90%, at least about 99%) of a volume of each of the additional trenches by sequentially forming a plurality of monolayers of the second material within the additional trenches. The trenches can be separated by rows of the first material. The layer of the first material can form a surface relief grating. The surface relief grating can have a grating period of about 500 nm or less (e.g., about 400 nm or less, about 300 nm or less, about 200 nm or less, about 100 nm or less).

The trench can be formed by etching (e.g., reactive ion etching) a continuous layer of the first material. The trench can be formed lithographically. For example, the trench can be formed using nano-imprint lithography or holographic lithography. Where the trench is formed using nano-imprint lithography, the nano-imprint lithography can include forming a pattern in a thermoplastic material. Alternatively, or additionally, the nano-imprint lithography can include forming a pattern in a UV curable material.

The method can further include forming a layer of the second material over the filled trench by sequentially forming monolayers of the second material over the trench. The layer of the second material has a surface with an arithmetic mean roughness of about 50 nm or less (e.g., about 40 nm or less, about 30 nm or less, about 20 nm or less, about 10 nm or less).

The second material can be a dielectric material. In some embodiments, forming the plurality of monolayers of the second material comprises depositing a monolayer of a precursor and exposing the monolayer of the precursor to a reagent to provide a monolayer of the second material. The reagent can chemically react with the precursor to form the second material. For example, the reagent can oxidize the precursor to form the second material. Depositing the monolayer of the precursor can include introducing a first gas comprising the precursor into a chamber housing the article. A pressure of the first gas in the chamber can be about 0.01 to about 100 Torr while the monolayer of the precursor is deposited. Exposing the monolayer of the precursor to the reagent can include introducing a second gas comprising the reagent into the chamber. A pressure of the second gas in the chamber can be about 0.01 to about 100 Torr while the monolayer of the precursor is exposed to the reagent. A third gas can be introduced into the chamber after the first gas is introduced and prior to introducing the second gas. The third gas can be inert with respect to the precursor. The third gas can include at least one gas selected from the group consisting of helium, argon, nitrogen, neon, krypton, and xenon. The precursor can be selected from the group consisting of tris(tert-butoxy) silanol, $(CH_3)_3Al$, $TiCl_4$, $SiCl_4$, $SiH_2Cl_2$, $TaCl_3$, $AlCl_3$, Hf-ethaoxide and Ta-ethaoxide.

The trench can have a width of about 1,000 nm or less (e.g., about 900 nm or less, about 800 nm or less, about 700 nm or less, about 600 nm or less, about 500 nm or less, about 400 nm or less, about 300 nm or less, about 200 nm or less). The trench can have a depth of about 10 nm or more (e.g., about 20 nm or more, about 30 nm or more, about 40 nm or more, about 50 nm or more, about 75 nm or more, about 100 nm or more, about 150 nm or more, about 200 nm or more, about 300 nm or more, about 400 nm or more, about 500 nm or more, about 1,000 or more, about 1,500 nm or more, about 2,000 nm or more).

The method can further include forming a second birefringent layer on the layer of the first material after filling the trench. The second birefringent layer can include a plurality of trenches and forming the second birefringent layer includes filling the plurality of trenches by sequentially forming a plurality of monolayers of a third material within the trenches of the second birefringent layer. The method can also include forming additional birefringent layers on the second birefringent layer.

In certain embodiments, the grating can be a surface relief grating. The grating can have a grating period of about 2,000 nm or less (e.g., about 1,500 nm or less, about 1,000 or less, about 750 nm or less, about 500 nm or less, about 300 nm or less, about 200 nm or less).

The optical retardation film can be form birefringent.

The article can further include at least one antireflection film, wherein a surface of the article comprises a surface of the antireflection film. In some embodiments, the article also includes a layer of a third material adjacent the continuous layer. The article can include a layer of the nanolaminate material adjacent the continuous layer. The layer of the nanolaminate material adjacent the continuous layer can have a surface with an arithmetic mean roughness of about 50 nm or less (e.g., about 40 nm or less, about 30 nm or less, about 20 nm or less, about 10 nm or less). The nanolaminate material can have a refractive index of about 1.3 or more at $\lambda$ (e.g., about 1.4 or more, about 1.5 or more, about 1.6 or more, about 1.7 or more, about 1.8 or more, about 1.9 or more, about 2.0 or more, about 2.1 or more). The first material can have a refractive index of about 1.3 or more at $\lambda$ (e.g., about 1.4 or more, about 1.5 or more, about 1.6 or more, about 1.7 or more, about 1.8 or more, about 1.9 or more, about 2.0 or more, about 2.1 or more). The nanolaminate material can include portions of a second material and portions of a third material, wherein the second and third materials are different. In some embodiments, the first and third materials are the same.

The nanolaminate material can include a dielectric material, an inorganic material, and/or a metal. The nanolaminate material can include a material selected from a group consisting of $SiO_2$, $SiN_x$, Si, $Al_2O_3$, $ZrO_2$, $Ta_2O_5$, $TiO_2$, $HfO_2$, $Nb_2O_5$, and $MgF_2$.

The first material can be a dielectric material, an inorganic material, a glass, a polymer, a semiconductor, and/or a metal. In certain embodiments, the first material is selected from a group consisting of $SiO_2$, $SiN_x$, Si, $Al_2O_3$, $ZrO_2$, $Ta_2O_5$, $TiO_2$, $HfO_2$, $Nb_2O_5$, and $MgF_2$.

The continuous layer can form a grating with a grating period of about 500 nm or less (e.g., about 200 nm or less, about 100 nm or less, about 50 nm or less). The rows of the first material can have a minimum width of about 500 nm or less (about 200 nm or less, about 100 nm or less, about 50 nm or less, about 20 nm or less, about 10 nm or less). The rows of the first material can have a minimum width that is the same or different than a minimum width of the rows of the nanolaminate material. A minimum width of each of the rows of the first material can be substantially the same. Alternatively, or additionally, a minimum width of each of the rows of the nanolaminate material is substantially the same.

The continuous layer has a thickness of about 15 nm or more (e.g., about 30 nm or more, about 50 nm or more, about 75 nm or more, about 100 nm or more, about 150 or more, about 200 nm or more, about 300 nm or more, about 500 nm or more, about 1,000 nm or more, about 1,500 nm or more, about 2,000 or more). In certain embodiments, the continuous layer has an optical retardation of about 1 nm or more (e.g., about 2 nm or more, about 5 nm or more, about 10 nm or more, about 20 nm or more, about 50 nm or more) for light of wavelength $\lambda$ propagating through the continuous layer along an axis, wherein $\lambda$ is between 150 nm and 2,000 nm. The continuous layer can have an optical retardation of about 2,000 nm or less for light of wavelength $\lambda$ propagating through the composite layer along an axis, wherein $\lambda$ is between 200 nm and 2,000 nm. In some embodiments, $\lambda$ is between about 400 nm and about 700 nm (e.g., between about 510 nm and about 570 nm). In some embodiments, the continuous layer has an optical retardation of about 4 nm or more for light of wavelength $\lambda$ propagating through the continuous layer along an axis, wherein $\lambda$ is between about 400 nm and about 700 nm.

The article can include a second continuous layer including rows of a third material alternating with rows of a second nanolaminate material, wherein the second continuous layer is birefringent for light of wavelength $\lambda$ propagating through the second continuous layer along the axis. The article can further include additional form birefringent layers, wherein each of the form birefringent layers are birefringent for light of wavelength $\lambda$ propagating through each foam birefringent layer along the axis.

Embodiments of the invention may include one or more of the following advantages.

In some embodiments, the article can be a relatively robust optical retarder, that can have high transmission at wavelengths of interest, and that have a retardation that can be precisely controlled. Optical retarders can include one or more form birefringent layers. Form birefringence results from sub-wavelength structure in a medium, which can be achieved by arranging at least two difference materials (e.g., optically isotropic materials) in an alternating way. Form birefringence can result from sub-wavelength grating structures, in which a medium has aperiodic modulation in its refractive index, where the period is substantially less than the wavelength of interest. Since the period is less than the wavelength of interest, substantially only zero-order diffractions occur and all higher order diffractions become evanescent (e.g., a beam at the wavelength of interest is substantially transmitted and/or reflected). While the materials composing the form birefringent media can be optically isotropic (i.e., having an isotropic index of refraction), the media itself will be optically anisotropic, giving rise to birefringence.

In some embodiments, optical retarders can include one or more form birefringent layers that are formed of continuous material, as opposed to, for example, having trenches filled with a gas (e.g., air). Accordingly, the optical retarders can be more mechanically robust than optical retarders that include non-continuous layers (e.g., layers that include one or more trenches filled with air).

In certain embodiments, continuous form birefringent layers can be formed having relatively high aspect ratios between the width and thickness of portions of the layers. As an example, high aspect ratio trenches can be etched into a layer, and the trenches subsequently filled using a conformal coating method (e.g., atomic layer deposition) to provide a continuous form birefringent layer having a relatively high aspect ratio.

The birefringence of optical retarders can be precisely controlled. To achieve this, the refractive index of one or more portions of a form birefringent layer in an optical retarder can, for example, be tuned to a desired value by controlling the composition of the portion(s), thereby controlling the birefringence. As an example, one or more portions of the layer can be formed from a nanolaminate. The refractive index of the nanolaminate can be tuned by selecting the proportion of two or more different materials in the nanolaminate, which can be controlled on a monolayer by monolayer basis where the nanolaminate is formed using atomic layer deposition.

Alternatively, or additionally, precisely controlling the structure of the layer can accurately control the birefringence of a form birefringent layer. For example, using lithographic techniques (e.g., electron beam lithography, nanoimprint lithography, holographic lithography) to define the structure (e.g., depth, width and profile of a grating) of a form birefringent layer can allow for precise control of the structure.

In certain embodiments, the retardance of optical retarders can be precisely controlled. For example, the birefringence and/or depth of a form birefringent layer in an optical retarder can be precisely controlled to provide a desired retardance. As an example, optical retarders can include one or more layers to control the thickness of portions of a form birefringent layer in the retarder, such as one or more etch stop layers.

In some embodiments, optical retarders have high transmission at wavelengths of interest. For example, optical retarders can include one or more antireflection films on one or more interfaces that reduce reflection of light at wavelengths of interest. Alternatively, or additionally, layers of optical retarders can be formed from materials with relatively low absorption at wavelengths of interest.

Other features, and advantages of the invention will be apparent from the description and drawings, and from the claims.

DESCRIPTION OF DRAWINGS

Like reference symbols in the various drawings indicate like elements.

DETAILED DESCRIPTION

Figure 1:
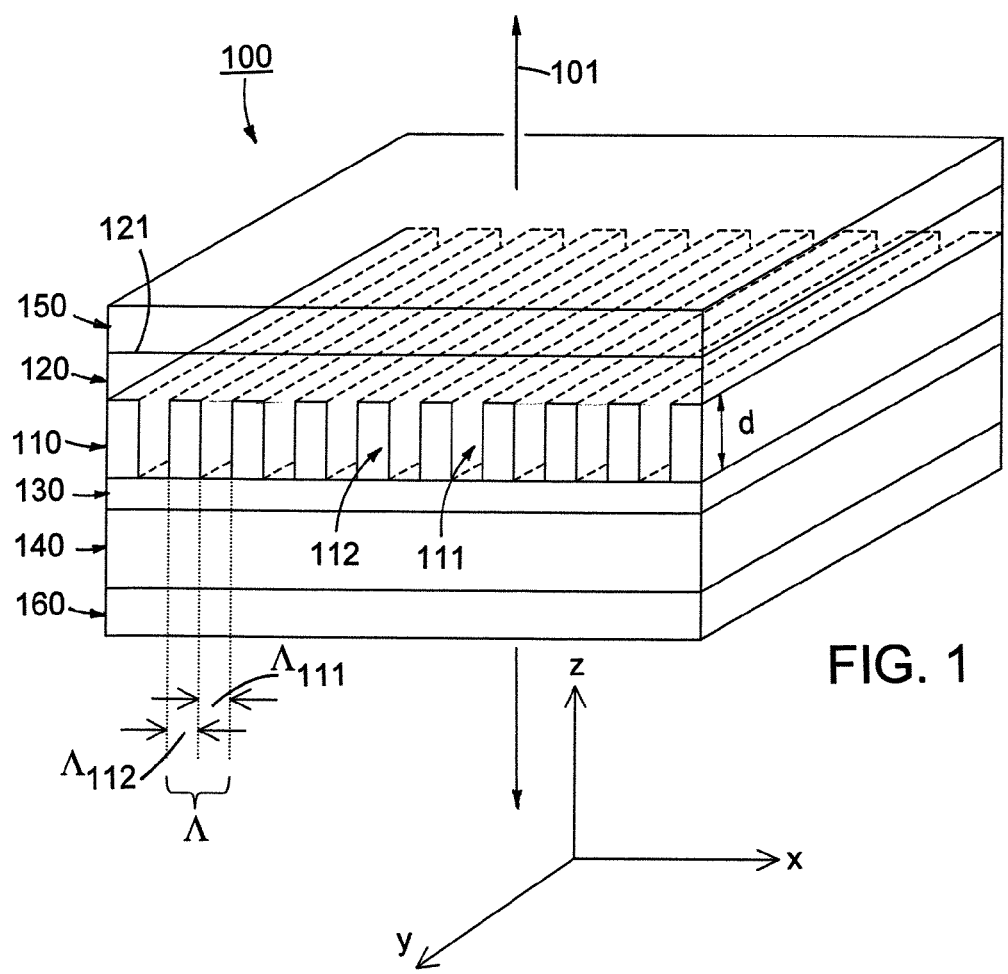
FIG. 1 is a perspective view of an embodiment of an optical retarder.

Referring to FIG. 1, an embodiment of an optical retarder 100 includes a retardation layer 110 and two antireflection films 150 and 160. Optical retarder 100 also includes a substrate 140, an etch stop layer 130, and a cap layer 120. Retardation layer 110 is in the form of a grating and includes portions 111 having a first refractive index and portions 112 having second refractive index. Retardation layer 110 is birefringent for light of wavelength propagating along an axis 101, parallel to the z-axis of the Cartesian coordinate system shown in FIG. 1. In general, $\lambda$ is between about 150 nm and about 5,000 nm. In certain embodiments, $\lambda$ corresponds to a wavelength within the visible portion of the electromagnetic spectrum (e.g., from about 400 nm to about 700 nm).

Portions 111 and 112 extend along the y-direction, forming a periodic structure consisting of a series of alternating rows having different indices of refraction. The rows corresponding to portions 111 have a width $\Lambda_{111}$ in the x-direction, while the rows corresponding to portions 112 have a width $\Lambda_{112}$ in the x-direction. The widths of the rows are smaller than $\lambda$, resulting in retardation layer 110 being form birefringent for light of wavelength $\lambda$ without encountering significant high-order diffraction. Optical waves with different polarization states propagate through retardation layer 110 with different phase shifts, which depend on the thickness of retardation layer 110, the index of refraction of portions 111 and 112, and $\Lambda_{111}$ and $\Lambda_{112}$. Accordingly, these parameters can be selected to provide a desired amount of retardation to polarized light at $\lambda$.

Retardation layer 110 has a birefringence, $\Delta n$, which corresponds to $n_e - n_o$, where $n_e$ and $n_o$ are the effective extraordinary and ordinary indices of refraction for layer 110, respectively. For retardation layer 110, $n_e$ and $n_o$ are given by:

$$n_o^2 = \frac{\Lambda_{111}}{\Lambda_{111} + \Lambda_{112}} n_{111}^2 + \frac{\Lambda_{112}}{\Lambda_{111} + \Lambda_{112}} n_{112}^2 \qquad (1)$$

$$\frac{1}{n_e^2} = \frac{\Lambda_{11}}{\Lambda_{111} + \Lambda_{112}} \frac{1}{n_{111}^2} + \frac{\Lambda_{112}}{\Lambda_{111} + \Lambda_{112}} \frac{1}{n_{112}^2}.$$

In Eq. (1), $n_{111}$ and $n_{112}$ and $\Lambda_{111}$ and $\Lambda_{112}$ refer to the refractive indices and thickness (along the x-direction) of portions 111 and 112 respectively. In general, the values of $n_e$ and $n_o$ depend on $n_{111}$, $n_{112}$, $\Lambda_{111}$ and $\Lambda_{112}$, and are between $n_{111}$ and $n_{112}$. $\Lambda_{111}$ and $\Lambda_{112}$ can be selected to provide a desired value of $\Delta n$ based on the values for $n_e$ and $n_o$ given by Eq. (1). Moreover, the refractive indices $n_{111}$ and $n_{112}$, which depend on the respective compositions of portions 111 and 112, can be selected to provide a desired value of $\Delta n$. In some embodiments, $\Delta n$ is relatively large (e.g., about 0.1 or more, about 0.15 or more, about 0.2 or more, about 0.3 or more, about 0.5 or more, about 1.0 or more, about 1.5 or more, about 2.0 or more). Alternatively, in other embodiments, $\Delta n$ is relatively small (e.g., about 0.05 or less, about 0.04 or less, about 0.03 or less, about 0.02 or less, about 0.01 or less, about 0.005 or less, about 0.002 or less, 0.001 or less).

In general, the refractive index of portions 111 can be about 1.3 or more (e.g., about 1.4 or more, about 1.5 or more, about 1.6 or more, about 1.7 or more, about 1.8 or more, about 1.9 or more, about 2.0 or more, about 2.1 or more, about 2.2 or more). Furthermore, in general, the refractive index of portions 112 can be about 1.3 or more (e.g., about 1.4 or more, about 1.5 or more, about 1.6 or more, about 1.7 or more, about 1.8 or more, about 1.9 or more, about 2.0 or more, about 2.1 or more, about 2.2 or more).

In general, $\Lambda_{111}$ can be about $0.2\lambda$ or less (e.g., about $0.1\lambda$ or less, about $0.05\lambda$ or less, about $0.04\lambda$ or less, about $0.03\lambda$ or less, about $0.02\lambda$ or less, $0.01\lambda$ or less). For example, in some embodiments, $\Lambda_{111}$ is about 200 nm or less (e.g., about 150 nm or less, about 100 nm or less, about 80 nm or less, about 70 nm or less, about 60 nm or less, about 50 nm or less, about 40 nm or less, about 30 nm or less). Similarly, $\Lambda_{112}$ can be about $0.2\lambda$ or less (e.g., about $0.1\lambda$ or less, about $0.05\lambda$ or less, about $0.04\lambda$ or less, about $0.03\lambda$ or less, about $0.02\lambda$ or less, $0.01\lambda$ or less). For example, in some embodiments, $\Lambda_{112}$ is about 200 nm or less (e.g., about 150 nm or less, about 100 nm or less, about 80 nm or less, about 70 nm or less, about 60 nm or less, about 50 nm or less, about 40 nm or less, about 30 nm or less). $\Lambda_{111}$ and $\Lambda_{112}$ can be the same as each other or different.

Along the x-axis, the refractive index of retardation layer 110 is periodic, with a period, $\Lambda$, corresponding to $\Lambda_{111}+\Lambda_{112}$. In general, $\Lambda$ is less than $\lambda$, such as about $0.5\lambda$ or less (e.g., about $0.3\lambda$ or less, about $0.2\lambda$ or less, about $0.1\lambda$ or less, about $0.08\lambda$ or less, about $0.05\lambda$ or less, about $0.04\lambda$ or less, about $0.03\lambda$ or less, about $0.02\lambda$ or less, $0.01\lambda$ or less). In some embodiments, $\Lambda$ is about 500 nm or less (e.g., about 300 nm or less, about 200 nm or less, about 100 nm or less, about 80 nm or less, about 60 nm or less, about 50 nm or less, about 40 nm or less).

While retardation layer 110 is shown as having 19 portions, in general, the number of portions in a retardation layer may vary as desired. The number of portions depends on the period, $\Lambda$, and the area required by the retarder's end use application. In some embodiments, retardation layer 110 can have about 50 or more portions (e.g., about 100 or more portions, about 500 or more portions, about 1,000 or more portions, about 5,000 or more portions, about 10,000 or more portions, about 50,000 or more portions, about 100,000 or more portions, about 500,000 more portions).

The thickness, d, of retardation layer 110 measured along the z-axis can vary as desired. In general, the thickness of layer 110 is selected based on the refractive indices of portions 111 and 112 and the desired retardation of retardation layer 110 at $\lambda$. In some embodiments, d can be about 50 nm or more (e.g., about 75 nm or more, about 100 nm or more, about 125 nm or more, about 150 nm or more, about 200 nm or more, about 250 nm or more, about 300 nm or more, about 400 nm or more, about 500 nm or more, about 1,000 or more, such as about 2,000 nm).

The aspect ratio of retardation layer thickness, d, to $\Lambda_{111}$ and/or d to $\Lambda_{112}$ can be relatively high. For example d:$\Lambda_{111}$ and/or d:$\Lambda_{112}$ can be about 2:1 or more (e.g., about 3:1 or more, about 4:1 or more, about 5:1 or more, about 8:1 or more, about 10:1 or more).

The retardation of retardation layer 110 corresponds to the product of the thickness of retardation layer 110, d, and $\Delta n$. By selecting appropriate values for $\Delta n$ and the layers thickness, the retardation can vary as desired. In some embodiments, the retardation of retardation layer 110 is about 50 nm or more (e.g., about 75 nm or more, about 100 nm or more, about 125 nm or more, about 150 nm or more, about 200 nm or more, about 250 nm or more, about 300 nm or more, about 400 nm or more, about 500 nm or more, about 1,000 or more, such as about 2,000 nm). Alternatively, in other embodiments, the retardation is about 40 nm or less (e.g., about 30 nm or less, about 20 nm or less, about 10 nm or less, about 5 nm or less, about 2 nm or less). In some embodiments, the retardation corresponds to $\lambda/4$ or $\lambda/2$.

Retardation can also be expressed as a phase retardation, $\Gamma$, where $$\Gamma = \frac{2\pi}{\lambda}\Delta nd. \quad (2)$$

For example, quarter wave retardation corresponds to $\Gamma=\pi/2$, while half wave retardation corresponds to $\Gamma=\pi$. In general, phase retardation may vary as desired. In some embodiments, phase retardation may be about $2\pi$ or less (e.g., about $0.8\pi$ or less, about $0.7\pi$ or less, about $0.6\pi$ or less, about $0.5\pi$ or less, about $0.4\pi$ or less, about $0.2\pi$ or less, $0.2\pi$ or less, about $0.1\pi$ or less, about $0.05\pi$ or less, $0.01\pi$ or less). Alternatively, in other embodiments, phase retardation of retardation layer 110 can be more than $2\pi$ (e.g., about $3\pi$ or more, about $4\pi$ or more, about $5\pi$ or more).

In general, the composition of portions 111 and 112 can vary as desired. Portions 111 and/or 112 can include inorganic and/or organic materials. Examples of inorganic materials include metals, semiconductors, and inorganic dielectric materials (e.g., glass). Examples of organic materials include polymers.

In some embodiments, portions 111 and/or portions 112 include one or more dielectric materials, such as dielectric oxides (e.g., metal oxides), fluorides (e.g., metal fluorides), sulphides, and/or nitrides (e.g., metal nitrides). Examples of oxides include $SiO_2$, $Al_2O_3$, $Nb_2O_5$, $TiO_2$, $ZrO_2$, $HfO_2$, $SnO_2$, $ZnO$, $ErO_2$, $Sc_2O_3$, and $Ta_2O_5$. Examples of fluorides include $MgF_2$. Other examples include ZnS, $SiN_x$, $SiO_yN_x$, AlN, TiN, and HfN.

The compositions of portions 111 and 112 are typically selected based on their optical properties and their compatibility with the processes used to manufacture optical retarder 100 and their compatibility with the materials used to form other layers of optical retarder 100. The composition of portions 111 and/or portions 112 can be selected to have particular refractive indices at $\lambda$. In general, the refractive index of portion 111 is different from the refractive index or portion 112 at $\lambda$. In some embodiments, portions 111 or portions 112 are formed from a material that has a relatively high index of refraction, such as $TiO_2$, which has a refractive index of about 2.35 at 632 nm, or $Ta_2O_5$, which has a refractive index of 2.15 at 632 nm. Alternatively, portions 111 or portions 112 can be formed from a material that has a relatively low index of refraction. Examples of low index materials include $SiO_2$ and $Al_2O_3$, which have refractive indices of 1.45 and 1.65 at 632 nm, respectively.

In some embodiments, the composition of portions 111 and/or portions 112 have a relatively low absorption at $\lambda$, so that retardation layer 110 has a relatively low absorption at $\lambda$. For example, retardation layer 110 can absorb about 5% or less of radiation at $\lambda$ propagating along axis 101 (e.g., about 3% or less, about 2% or less, about 1% or less, about 0.5% or less, about 0.2% or less, about 0.1% or less).

Portions 111 and/or portions 112 can be formed from a single material or from multiple different materials. In some embodiments, one or both of portions 111 and 112 are formed from a nanolaminate material, which refers to materials that are composed of layers of at least two different materials and the layers of at least one of the materials are extremely thin (e.g., between one and about 10 monolayers thick). Optically, nanolaminate materials have a locally homogeneous index of refraction that depends on the refractive index of its constituent materials. Varying the amount of each constituent material can vary the refractive index of a nanolaminate. Examples of nanolaminate portions include portions composed of $SiO_2$ monolayers and $TiO_2$ monolayers, $SiO_2$ monolayers and $Ta_2O_5$ monolayers, or $Al_2O_3$ monolayers and $TiO_2$ monolayers Portions 111 and/or portions 112 can include crystalline, semi-crystalline, and/or amorphous portions. Typically, an amorphous material is optically isotropic and may transmit light better than portions that are partially or mostly crystalline. As an example, in some embodiments, both portions 111 and 112 are formed from amorphous materials, such as amorphous dielectric materials (e.g., amorphous $TiO_2$ or $SiO_2$). Alternatively, in certain embodiments, portions 111 are formed from a crystalline or semi-crystalline material (e.g., crystalline or semi-crystalline Si), while portions 112 are formed from an amorphous material (e.g., an amorphous dielectric material, such as $TiO_2$ or $SiO_2$).

Referring now to other layers in optical retarder 100, in general, substrate 140 provides mechanical support to optical retarder 100. In certain embodiments, substrate 140 is transparent to light at wavelength λ, transmitting substantially all light impinging thereon at wavelength λ (e.g., about 90% or more, about 95% or more, about 97% or more, about 99% or more, about 99.5% or more).

In general, substrate 140 can be formed from any material compatible with the manufacturing processes used to produce retarder 100 that can support the other layers. In certain embodiments, substrate 140 is formed from a glass, such as BK7 (available from Abrisa Corporation), borosilicate glass (e.g., pyrex available from Corning), aluminosilicate glass (e.g., C1737 available from Corning), or quartz/fused silica. In some embodiments, substrate 140 can be formed from a crystalline material, such as a non-linear optical crystal (e.g., $LiNbO_3$ or a magneto-optical rotator, such as garnett) or a crystalline (or semicrystalline) semiconductor (e.g., Si, InP, or GaAs). Substrate 140 can also be formed from an inorganic material, such as a polymer (e.g., a plastic).

Etch stop layer 130 is formed from a material resistant to etching processes used to etch the material(s) from which portions 112 are formed (see discussion below). The material(s) forming etch stop layer 130 should also be compatible with substrate 140 and with the materials forming retardation layer 110. Examples of materials that can form etch stop layer 130 include $HfO_2$, $SiO_2$, $Ta_2O_5$, $TiO_2$, $SiN_x$, or metals (e.g., Cr, Ti, Ni).

The thickness of etch stop layer 130 can be varied as desired. Typically, etch stop layer 130 is sufficiently thick to prevent significant etching of substrate 140, but should not be so thick as to adversely impact the optical performance of optical retarder 100. In some embodiments, etch stop layer is about 500 nm or less (e.g., about 250 nm or less, about 100 nm or less, about 75 nm or less, about 50 nm or less, about 40 nm or less; about 30 nm or less, about 20 nm or less).

Cap layer 120 is typically formed from the same material(s) as portions 111 of retardation layer 110 and provides a surface 121 onto which additional layers, such as the layers forming antireflection film 150, can be deposited. Surface 121 can be substantially planar.

Antireflection films 150 and 160 can reduce the reflectance of light of wavelength λ impinging on and exiting optical retarder 100. Antireflection film 150 and 160 generally include one or more layers of different refractive index. As an example, one or both of antireflection films 150 and 160 can be formed from four alternating high and low index layers. The high index layers can be formed from $TiO_2$ or $Ta_2O_5$ and the low index layers can be foamed from $SiO_2$ or $MgF_2$. The antireflection films can be broadband antireflection films or narrowband antireflection films.

In some embodiments, optical retarder 100 has a reflectance of about 5% or less of light impinging thereon at wavelength λ (e.g., about 3% or less, about 2% or less, about 1% or less, about 0.5% or less, about 0.2% or less). Furthermore, optical retarder 100 can have high transmission of light of wavelength λ. For example, optical retarder can transmit about 95% or more of light impinging thereon at wavelength λ (e.g., about 98% or more, about 99% or more, about 99.5% or more).

Figure 2A:
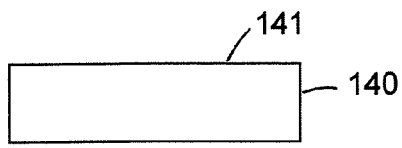
FIGS. 2A-2J show steps in the manufacture of the optical retarder shown in FIG. 1.

In general, optical retarder 100 can be prepared as desired. FIGS. 2A-2J show different phases of an example of a preparation process. Initially, substrate 140 is provided, as shown in FIG. 2A. Surface 141 of substrate 140 can be polished and/or cleaned (e.g., by exposing the substrate to one or more solvents, acids, and/or baking the substrate).

Figure 2B:
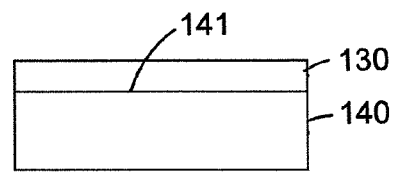

Referring to FIG. 2B, etch stop layer 130 is deposited on surface 141 of substrate 140. The material forming etch stop layer 130 can be formed using one of a variety of techniques, including sputtering (e.g., radio frequency sputtering), evaporating (e.g., electron beam evaporation, ion assisted deposition (IAD) electron beam evaporation), or chemical vapor deposition (CVD) such as plasma enhanced CVD (PECVD), ALD, or by oxidization. As an example, a layer of $HfO_2$ can be deposited on substrate 140 by _IAD electron beam evaporation.

Figure 2C:
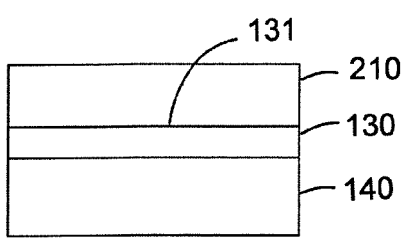

Referring to FIG. 2C, an intermediate layer 210 is then deposited on surface 131 of etch stop layer 130. Portions 112 are etched from intermediate layer 210, so intermediation layer 210 is formed from the material used for portions 112. The material forming intermediate layer 210 can be deposited using one of a variety of techniques, including sputtering (e.g., radio frequency sputtering), evaporating (e.g., election beam evaporation), or chemical vapor deposition (CVD) (e.g., plasma enhanced CVD). As an example, a layer of $SiO_2$ can be deposited on etch stop layer 130 by sputtering (e.g., radio frequency sputtering), CVD (e.g., plasma enhanced CVD), or electron beam evaporation (e.g., IAD electron beam deposition). The thickness of intermediate layer 210 is selected based on the desired thickness of retardation layer 110.

Figure 2D:
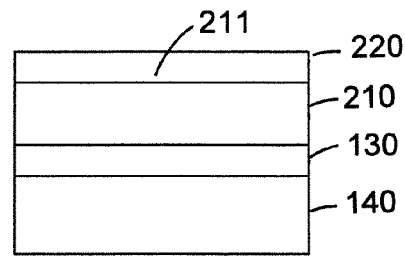
Figure 2E:
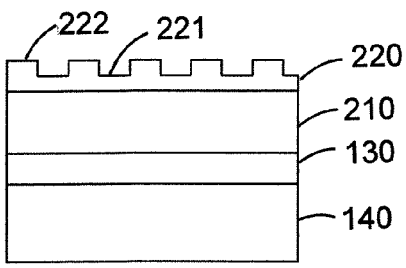
Figure 2F:
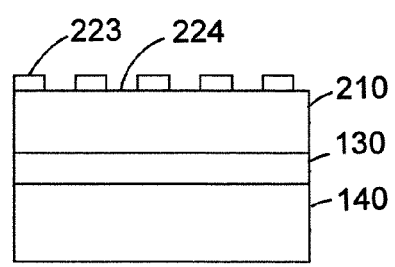

Intermediate layer 210 is processed to provide portions 112 of retardation layer 110 using lithographic techniques. For example, portions 112 can be formed from intermediate layer 210 using electron beam lithography or photolithography (e.g., using a photomask or using holographic techniques). In some embodiments, portions 112 are formed using nanoimprint lithography. Referring to FIG. 2D, nano-imprint lithography includes forming a layer 220 of a resist on surface 211 of intermediate layer 210. The resist can be polymethylmethacrylate (PMMA) or polystyrene (PS), for example. Referring to FIG. 2E, a pattern is impressed into resist layer 220 using a mold. The patterned resist layer 220 includes thin portions 221 and thick portions 222. Patterned resist layer 220 is then etched (e.g., by oxygen reactive ion etching (RIE)), removing thin portions 221 to expose portions 224 of surface 211 of intermediate layer 210, as shown in FIG. 2F. Thick portions 222 are also etched, but are not completely removed. Accordingly, portions 223 of resist remain on surface 211 after etching.

Figure 2G:
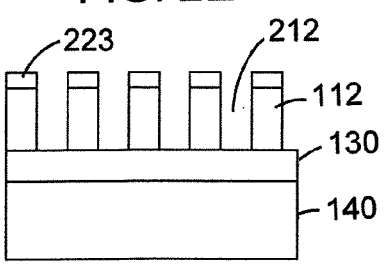
Figure 2H:
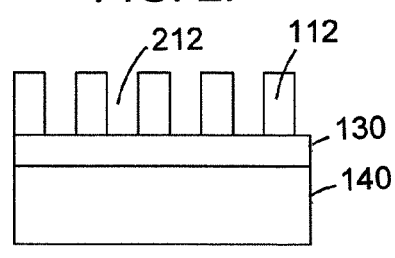

Referring to FIG. 2G, the exposed portions of intermediate layer 210 are subsequently etched, forming trenches 212 in intermediate layer 210. The unetched portions of intermediate layer 210 correspond to portions 112 of retardation layer 110. Intermediate layer 210 can be etched using, for example, reactive ion etching, ion beam etching, sputtering etching, chemical assisted ion beam etching (CAIBE), or wet etching. The exposed portions of intermediate layer 210 are etched down to etch stop layer 130, which is formed from a material resistant to the etching method. Accordingly, the depth of trenches 212 formed by etching is the same as the thickness of portions 112. After etching trenches 212, residual resist 223 is removed from portions 112. Resist can be removed by rinsing the article in a solvent (e.g., an organic solvent, such as acetone or alcohol), by $O_2$ plasma ashing, $O_2$ RIE, or ozone cleaning.

Figure 2I:
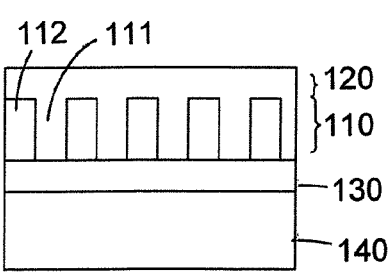
Figure 2J:
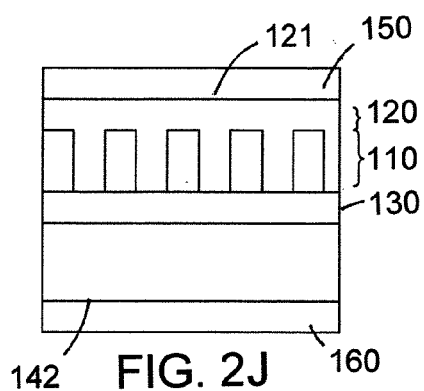

Referring to FIG. 2I, after removing residual resist, material is deposited onto the article, filling trenches 212 and forming cap layer 120. The filled trenches correspond to portions 111 of retardation layer 110. Material can be deposited onto the article in a variety of ways, including sputtering, electron beam evaporation, CVD (e.g., high density CVD) or atomic layer deposition (ALD), for example, shown at FIGS. 10A-10C. Note that where cap layer 120 is formed and trenches 212 are filled during the same deposition step, portions 111 and cap layer 120 are formed from a continuous portion of material.

Finally, antireflection films 150 and 160 are deposited onto surface 121 of cap layer 120 and surface 142 of substrate 140, respectively. Materials forming the antireflection films can be deposited onto the article by sputtering, electron beam evaporation, or ALD, for example.

Figure 3:
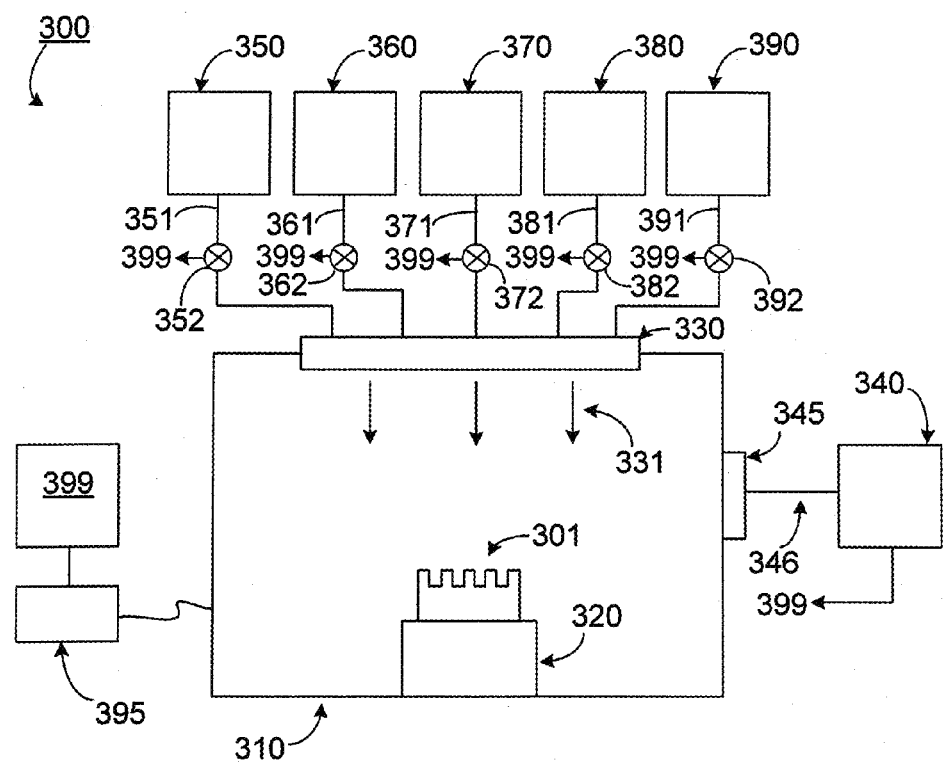
FIG. 3 is a schematic diagram of an atomic layer deposition system.
Figure 10A:
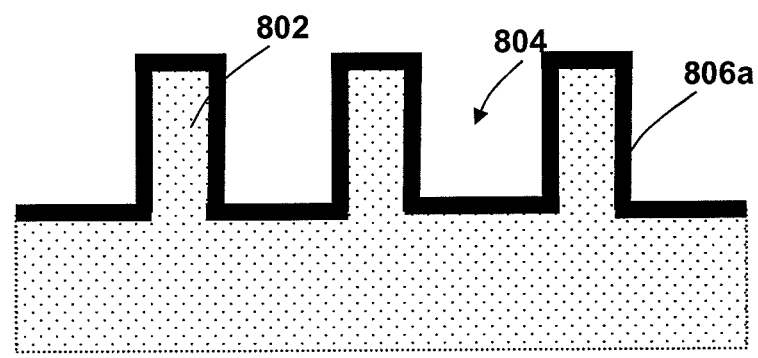
FIGS. 10A-10C show steps in the manufacture of an optical retarder.
Figure 10B:
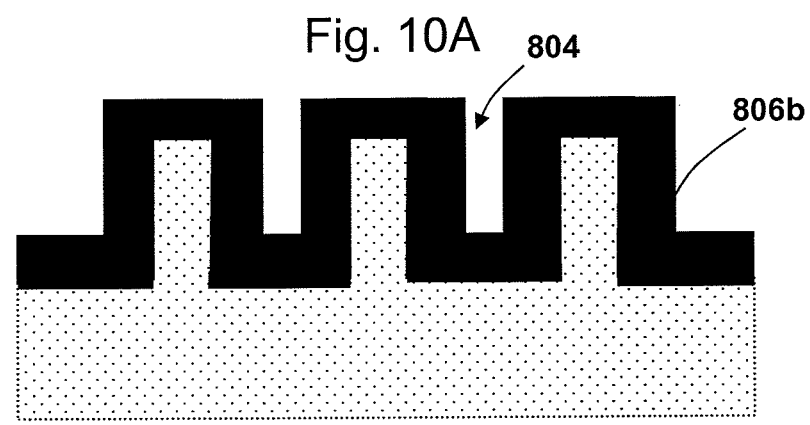
Figure 10C:
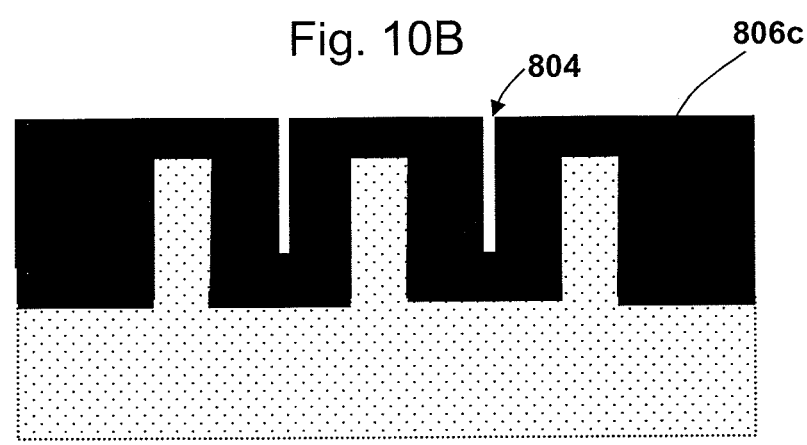

As mentioned previously, in some embodiments, portions 111 of retardation layer 110, cap layer 120, and/or one or both of antireflection films 150 and 160 are prepared using atomic layer deposition (ALD). For example, referring to FIG. 3, an ALD system 300 is used to fill trenches 212 of an intermediate article 301 (composed of substrate 140, cap layer 130, and portions 112) with a nanolaminate multilayer film, forming portions 111 and cap layer 120. Deposition of the nanolaminate multilayer film occurs monolayer by monolayer, providing substantial control over the composition and thickness of the films. During deposition of a monolayer, vapors of a precursor are introduced into the chamber and are adsorbed onto exposed surfaces of portions 112, etch stop layer surface 131 or previously deposited monolayers adjacent these surfaces. Subsequently, a reactant is introduced into the chamber that reacts chemically with the adsorbed precursor, forming a monolayer of a desired material. The self-limiting nature of the chemical reaction on the surface can provide precise control of film thickness and large-area uniformity of the deposited layer. Moreover, the non-directional adsorption of precursor onto each exposed surface provides for uniform deposition of material onto the exposed surfaces, regardless of the orientation of the surface relative to chamber 110. Accordingly, the layers of the nanolaminate film conform to the shape of the trenches of intermediate article 301. For example, as shown at FIGS. 10A-10C, layers of a multilayer film 806a-806c (generally, 806) are positioned on surfaces of portions 802 of a retardation layer, and conform to the shape of the trenches 804. As shown in FIG. 10C, at least about 80%, or at least about 90%, or at least about 99% of the volume of the trench 804 can be filled by sequentially forming the plurality of monolayers within the trench 804.

ALD system 300 includes a reaction chamber 310, which is connected to sources 350, 360, 370, 380, and 390 via a manifold 330. Sources 350, 360, 370, 380, and 390 are connected to manifold 330 via supply lines 351, 361, 371, 381, and 391, respectively. Valves 352, 362, 372, 382, and 392 regulate the flow of gases from sources 350, 360, 370, 380, and 390, respectively. Sources 350 and 380 contain a first and second precursor, respectively, while sources 360 and 390 include a first reagent and second reagent, respectively. Source 370 contains a carrier gas, which is constantly flowed through chamber 310 during the deposition process transporting precursors and reagents to article 301, while transporting reaction byproducts away from the substrate. Precursors and reagents are introduced into chamber 310 by mixing with the carrier gas in manifold 330. Gases are exhausted from chamber 310 via an exit port 345. A pump 340 exhausts gases from chamber 310 via an exit port 345. Pump 340 is connected to exit port 345 via a tube 346.

ALD system 300 includes a temperature controller 395, which controls the temperature of chamber 310. During deposition, temperature controller 395 elevates the temperature of article 301 above room temperature. In general, the temperature should be sufficiently high to facilitate a rapid reaction between precursors and reagents, but should not damage the substrate. In some embodiments, the temperature of article 301 can be about 500° C. or less (e.g., about 400° C. or less, about 300° C. or less, about 200° C. or less, about 150° C. or less, about 125° C. or less, about 100° C. or less).

Typically, the temperature should not vary significantly between different portions of article 301. Large temperature variations can cause variations in the reaction rate between the precursors and reagents at different portions of the substrate, which can cause variations in the thickness and/or morphology of the deposited layers. In some embodiments, the temperature between different portions of the deposition surfaces can vary by about 40° C. or less (e.g., about 30° C. or less, about 20° C. or less, about 10° C. or less, about 5° C. or less).

Deposition process parameters are controlled and synchronized by an electronic controller 399. Electronic controller 399 is in communication with temperature controller 395; pump 340; and valves 352, 362, 372, 382, and 392. Electronic controller 399 also includes a user interface, from which an operator can set deposition process parameters, monitor the deposition process, and otherwise interact with system 300.

Figure 4:
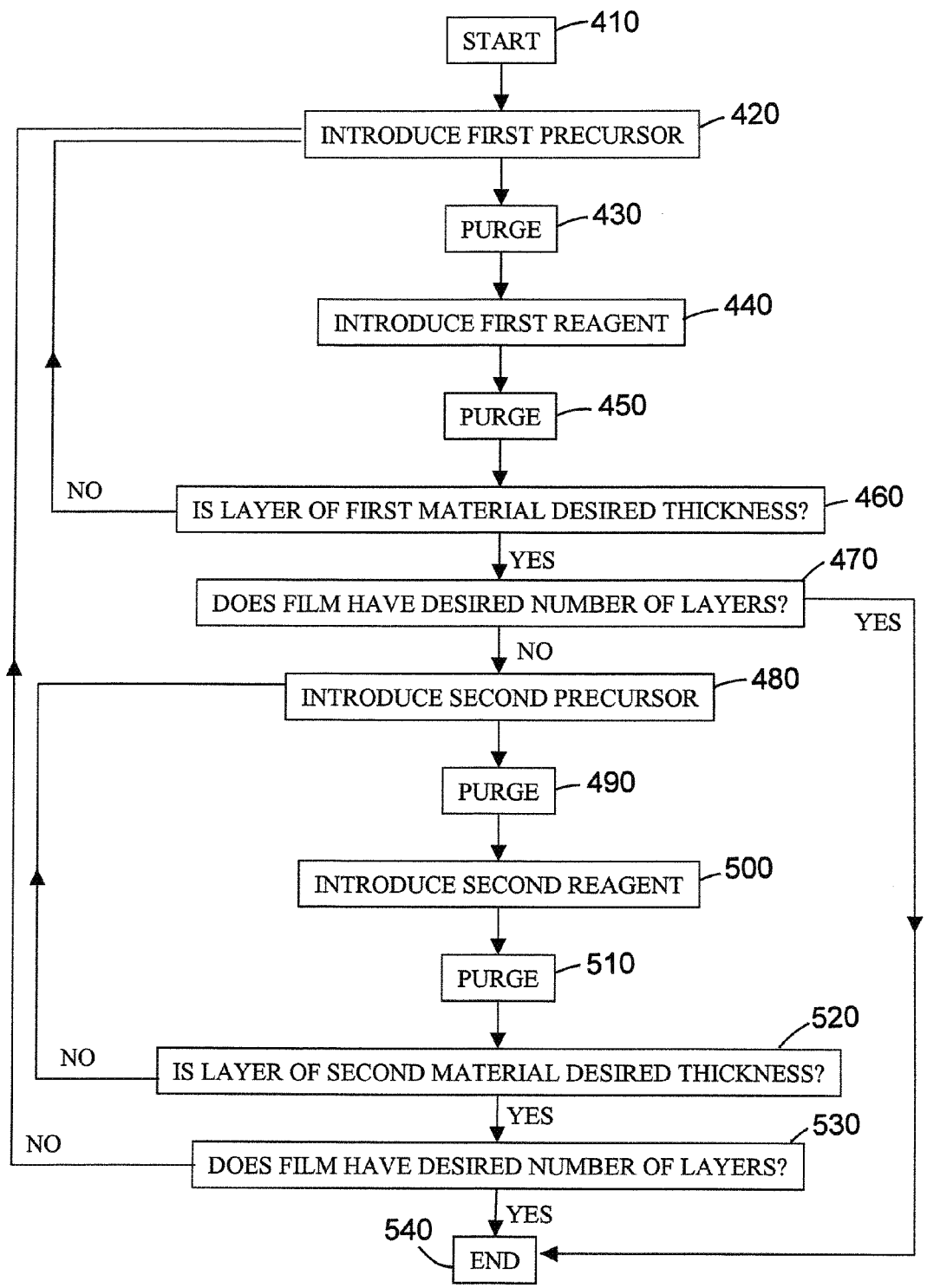
FIG. 4 is a flow chart showing steps for forming a nanolaminate using atomic layer deposition.

Referring to FIG. 4, the ALD process is started (410) when system 300 introduces the first precursor from source 350 into chamber 310 by mixing it with carrier gas from source 370 (420). A monolayer of the first precursor is adsorbed onto exposed surfaces of article 301, and residual precursor is purged from chamber 310 by the continuous flow of carrier gas through the chamber (430). Next, the system introduces a first reagent from source 360 into chamber 310 via manifold 330 (440). The first reagent reacts with the monolayer of the first precursor, forming a monolayer of the first material. As for the first precursor, the flow of carrier gas purges residual reagent from the chamber (450). Steps 420 through 460 are repeated until the layer of the first material reaches a desired thickness (460).

In embodiments where the films are a single layer of material, the process ceases once the layer of first material reaches the desired thickness (470). However, for a nanolaminate film, the system introduces a second precursor into chamber 310 through manifold 330 (380). A monolayer of the second precursor is adsorbed onto the exposed surfaces of the deposited layer of first material and carrier gas purges the chamber of residual precursor (490). The system then introduces the second reagent from source 380 into chamber 310 via manifold 330. The second reagent reacts with the monolayer of the second precursor, forming a monolayer of the second material (500). Flow of carrier gas through the chamber purges residual reagent (510). Steps 580 through 510 are repeated until the layer of the second material reaches a desired thickness (520).

Additional layers of the first and second materials are deposited by repeating steps 520 through 530. Once the desired number of layers are formed (e.g., the trenches are filled and/or cap layer has a desired thickness), the process terminates (540), and the coated article is removed from chamber 310.

Although the precursor is introduced into the chamber before the reagent during each cycle in the process described above, in other examples the reagent can be introduced before the precursor. The order in which the precursor and reagent are introduced can be selected based on their interactions with the exposed surfaces. For example, where the bonding energy between the precursor and the surface is higher than the bonding energy between the reagent and the surface, the precursor can be introduced before the reagent. Alternatively, if the binding energy of the reagent is higher, the reagent can be introduced before the precursor.

The thickness of each monolayer generally depends on a number of factors. For example, the thickness of each monolayer can depend on the type of material being deposited. Materials composed of larger molecules may result in thicker monolayers compared to materials composed of smaller molecules.

The temperature of the article can also affect the monolayer thickness. For example, for some precursors, a higher temperate can reduce adsorption of a precursor onto a surface during a deposition cycle, resulting in a thinner monolayer than would be formed if the substrate temperature were lower.

The type or precursor and type of reagent, as well as the precursor and reagent dosing can also affect monolayer thickness. In some embodiments, monolayers of a material can be deposited with a particular precursor, but with different reagents, resulting in different monolayer thickness for each combination. Similarly, monolayers of a material formed from different precursors can result in different monolayer thickness for the different precursors.

Examples of other factors which may affect monolayer thickness include purge duration, residence time of the precursor at the coated surface, pressure in the reactor, physical geometry of the reactor, and possible effects from the byproducts on the deposited material. An example of where the byproducts affect the film thickness are where a byproduct etches the deposited material. For example, HCl is a byproduct when depositing $TiO_2$ using a $TiCl_4$ precursor and water as a reagent. HCl can etch the deposited $TiO_2$ before it is exhausted. Etching will reduce the thickness of the deposited monolayer, and can result in a varying monolayer thickness across the substrate if certain portions of the substrate are exposed to HCl longer than other portions (e.g., portions of the substrate closer to the exhaust may be exposed to byproducts longer than portions of the substrate further from the exhaust).

Typically, monolayer thickness is between about 0.1 nm and about five nm. For example, the thickness of one or more of the deposited monolayers can be about 0.2 nm or more (e.g., about 0.3 nm or more, about 0.5 nm or more). In some embodiments, the thickness of one or more of the deposited monolayers can be about three nm or less (e.g., about two nm, about one nm or less, about 0.8 nm or less, about 0.5 nm or less).

The average deposited monolayer thickness may be determined by depositing a preset number of monolayers on a substrate to provide a layer of a material. Subsequently, the thickness of the deposited layer is measured (e.g., by ellipsometry, electron microscopy, or some other method). The average deposited monolayer thickness can then be determined as the measured layer thickness divided by the number of deposition cycles. The average deposited monolayer thickness may correspond to a theoretical monolayer thickness. The theoretical monolayer thickness refers to a characteristic dimension of a molecule composing the monolayer, which can be calculated from the material's bulk density and the molecules molecular weight. For example, an estimate of the monolayer thickness for $SiO_2$ is ~0.37 nm. The thickness is estimated as the cube root of a formula unit of amorphous $SiO_2$ with density of 2.0 grams per cubic centimeter.

In some embodiments, average deposited monolayer thickness can correspond to a fraction of a theoretical monolayer thickness (e.g., about 0.2 of the theoretical monolayer thickness, about 0.3 of the theoretical monolayer thickness, about 0.4 of the theoretical monolayer thickness, about 0.5 of the theoretical monolayer thickness, about 0.6 of the theoretical monolayer thickness, about 0.7 of the theoretical monolayer thickness, about 0.8 of the theoretical monolayer thickness, about 0.9 of the theoretical monolayer thickness). Alternatively, the average deposited monolayer thickness can correspond to more than one theoretical monolayer thickness up to about 30 times the theoretical monolayer thickness (e.g., about twice or more than the theoretical monolayer thickness, about three time or more than the theoretical monolayer thickness, about five times or more than the theoretical monolayer thickness, about eight times or more than the theoretical monolayer thickness, about 10 times or more than the theoretical monolayer thickness, about 20 times or more than the theoretical monolayer thickness).

During the deposition process, the pressure in chamber 310 can be maintained at substantially constant pressure, or can vary. Controlling the flow rate of carrier gas through the chamber generally controls the pressure. In general, the pressure should be sufficiently high to allow the precursor to saturate the surface with chemisorbed species, the reagent to react completely with the surface species left by the precursor and leave behind reactive sites for the next cycle of the precursor. If the chamber pressure is too low, which may occur if the dosing of precursor and/or reagent is too low, and/or if the pump rate is too high, the surfaces may not be saturated by the precursors and the reactions may not be self limited. This can result in an uneven thickness in the deposited layers. Furthermore, the chamber pressure should not be so high as to hinder the removal of the reaction products generated by the reaction of the precursor and reagent. Residual byproducts may interfere with the saturation of the surface when the next dose of precursor is introduced into the chamber. In some embodiments, the chamber pressure is maintained between about 0.01 Torr and about 100 Torr (e.g., between about 0.1 Torr and about 20 Torr, between about 0.5 Torr and 10 Torr, such as about 1 Torr).

Generally, the amount of precursor and/or reagent introduced during each cycle can be selected according to the size of the chamber, the area of the exposed substrate surfaces, and/or the chamber pressure. The amount of precursor and/or reagent introduced during each cycle can be determined empirically.

The amount of precursor and/or reagent introduced during each cycle can be controlled by the timing of the opening and closing of valves 352, 362, 382, and 392. The amount of precursor or reagent introduced corresponds to the amount of time each valve is open each cycle. The valves should open for sufficiently long to introduce enough precursor to provide adequate monolayer coverage of the substrate surfaces. Similarly, the amount of reagent introduced during each cycle should be sufficient to react with substantially all precursor deposited on the exposed surfaces. Introducing more precursor and/or reagent than is necessary can extend the cycle time and/or waste precursor and/or reagent. In some embodiments, the precursor dose corresponds to opening the appropriate valve for between about 0.1 seconds and about five seconds each cycle (e.g., about 0.2 seconds or more, about 0.3 seconds or more, about 0.4 seconds or more, about 0.5 seconds or more, about 0.6 seconds or more, about 0.8 seconds or more, about one second or more). Similarly, the reagent dose can correspond to opening the appropriate valve for between about 0.1 seconds and about five seconds each cycle (e.g., about 0.2 seconds or more, about 0.3 seconds or more, about 0.4 seconds or more, about 0.5 seconds or more, about 0.6 seconds or more, about 0.8 seconds or more, about one second or more)

The time between precursor and reagent doses corresponds to the purge. The duration of each purge should be sufficiently long to remove residual precursor or reagent from the chamber, but if it is longer than this it can increase the cycle time without benefit. The duration of different purges in each cycle can be the same or can vary. In some embodiments, the duration of a purge is about 0.1 seconds or more (e.g., about 0.2 seconds or more, about 0.3 seconds or more, about 0.4 seconds or more, about 0.5 seconds or more, about 0.6 seconds or more, about 0.8 seconds or more, about one second or more, about 1.5 seconds or more, about two seconds or more). Generally, the duration of a purge is about 10 seconds or less (e.g., about eight seconds or less, about five seconds or less, about four seconds or less, about three seconds or less).

The time between introducing successive doses of precursor corresponds to the cycle time. The cycle time can be the same or different for cycles depositing monolayers of different materials. Moreover, the cycle time can be the same or different for cycles depositing monolayers of the same material, but using different precursors and/or different reagents. In some embodiments, the cycle time can be about 20 seconds or less (e.g., about 15 seconds or less, about 12 seconds or less, about 10 seconds or less, about 8 seconds or less, about 7 seconds or less, about 6 seconds or less, about 5 seconds or less, about 4 seconds or less, about 3 seconds or less). Reducing the cycle time can reduce the time of the deposition process.

The precursors are generally selected to be compatible with the ALD process, and to provide the desired deposition materials upon reaction with a reagent. In addition, the precursors and materials should be compatible with the material on which they are deposited (e.g., with the substrate material or the material forming the previously deposited layer). Examples of precursors include chlorides (e.g., metal chlorides), such as $TiCl_4$, $SiCl_4$, $SiH_2Cl_2$, $TaCl_3$, $HfCl_4$, $InCl_3$ and $AlCl_3$. In some embodiments, organic compounds can be used as a precursor (e.g., Ti-ethaOxide, Ta-ethaOxide, Nb-ethaOxide). Another example of an organic compound precursor is $(CH_3)_3Al$.

The reagents are also generally selected to be compatible with the ALD process, and are selected based on the chemistry of the precursor and material. For example, where the material is an oxide, the reagent can be an oxidizing agent. Examples of suitable oxidizing agents include water, hydrogen peroxide, oxygen, ozone, $(CH_3)_3Al$, and various alcohols (e.g., Ethyl alcohol $CH_3OH$). Water, for example, is a suitable reagent for oxidizing precursors such as $TiCl_4$ to obtain $TiO_2$, $AlCl_3$ to obtain $Al_2O_3$, and Ta-ethaoxide to obtain $Ta_2O_5$, Nb-ethaoxide to obtain $Nb_2O_5$, $HfCl_4$ to obtain $HfO_2$, $ZrCl_4$ to obtain $ZrO_2$, and $InCl_3$ to obtain $In_2O_3$. In each case, HCl is produced as a byproduct. In some embodiments, $(CH_3)_3Al$ can be used to oxidize silanol to provide $SiO_2$.

While certain embodiments have been described, the invention, in general, is not so limited. For example, while optical retarder 100 (see FIG. 1) shows a specific configuration of different layers, other embodiments can include additional or fewer layers. For example, in certain embodiments optical retarders need not include one or both of antireflection films 150 and 160. In some embodiments, optical retarder's can include additional antireflection films (e.g., between substrate layer 140 and etch stop layer 130). Embodiments can also include protective layers, such as hardcoat layers (e.g., hardcoat polymers) on one or both of antireflection films 150 and 160. In certain embodiments, optical retarders need not include a cap layer. For example, the cap layer, which forms while filling trenches between portions 112, can be removed once portions 111 are formed. The cap layer can be removed by, e.g., chemical mechanical polishing or etching.

Figure 5:
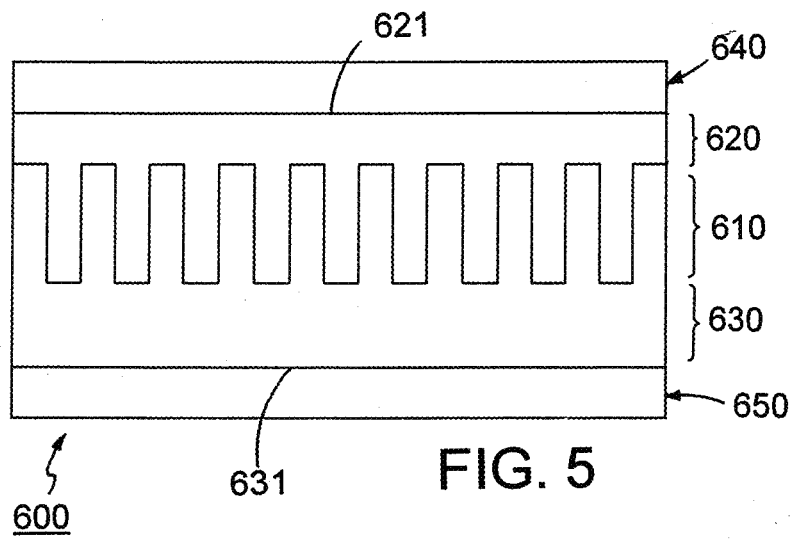
FIG. 5 is a cross-sectional view of another embodiment of an optical retarder.

Referring to FIG. 5, in some embodiments, an optical retarder 600 is formed by partially etching trenches directly into a substrate layer, and subsequently filling the trenches to provide a continuous retardation layer 610. Optical retarder 600 also includes a cap layer 620, and a base layer 630, which corresponds to an unetched portion of the original substrate layer. An antireflection film 640 is deposited on surface 621 of cap layer 602, and a second antireflection film 650 is deposited on surface 631 of base layer 630.

Figure 6:
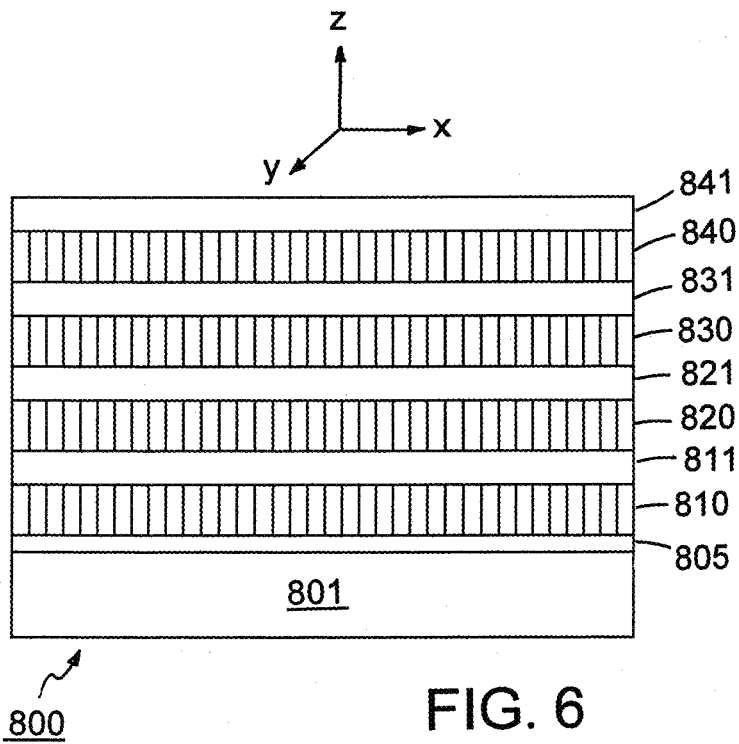
FIG. 6 is a cross-sectional view of an embodiment of an optical retarder including multiple retardation layers.

In certain embodiments, optical retarders can be formed from more than one retardation layer. For example, referring to FIG. 6, an optical retarder 800 includes four retardation layers 810, 820, 830, and 840. Optical retarder 800 also includes a substrate layer 801, an etch stop layer 805, and cap layers 811, 821, 831, and 841.

Retardation layers 810, 820, 830, and 840 can have the same retardation for a beam of light having wavelength $\lambda$, or can have different retardations.

Optical retarder 800 can be prepared using methods disclosed herein. For example, each retardation layer and its corresponding cap layer can be formed by depositing and etching an intermediate layer either on etch stop layer 805 (e.g., retardation layer 810) or on the previously deposited cap layer (e.g., retardation layers 820, 830, and 840), and then depositing materials to fill the etched trenches and form the cap layers.

In some embodiments, additional etch stop layers can be deposited onto a cap layer prior to forming a subsequent retardation layer. Of course, other layers may also be included, such as antireflection films, for example.

In general, the thickness of retardation layers 810, 820, 830, and 840 along the z-direction, the width of their portions (along the x-direction), and the materials used to form them may vary as desired. In some embodiments, retardation layers 810, 820, 830, and 840 are identical, while in other embodiments, one or more of the retardation layers can be different (e.g., composed of one or more different materials to the other retardation layers, have a different thickness, and/or have a different birefringence).

Moreover, while optical retarder 800 has four retardation layers, in general, embodiments can include more than or less than four retardation layers. Optical retarders can include two retardation layers, three retardation layers, or five or more retardation layers (e.g., about 10 or more retardation layers, about 20 or more retardation layers, about 30 or more retardation layers, about 100 or more retardation layers, about 1000 or more retardation layers).

The total phase retardation for light of wavelength $\lambda$ propagating through an optical retarder having more than one retardation layer can be relatively large. For example, an optical retarder can have a phase retardation of about $2\pi$ or more at $\lambda$ (e.g., about $3\pi$ or more, about $4\pi$ or more, about $5\pi$ or more, about $8\pi$ or more, about $10\pi$ or more, about $12\pi$ or more, about $15\pi$ or more, about $20\pi$ or more, about $30\pi$ or more.

The total thickness (along the z-direction) of optical retarders than include more than one retardation layer can be about 200 μm or more (e.g., about 500 μm or more, about 800 μm or more, about 1,000 μm or more, about 1,500 μm or more, about 2,000 μm or more, about 5,000 μm or more).

In certain embodiments, optical retarders can be used as an optical walk-off crystal, which splits non-normally incident light (i.e., light not propagating along the z-direction) into an ordinary and an extraordinary ray, which exit the retarder along different paths. Such optical walk-off crystals can be re-cut and polished into a wedge. Walk-off crystals can be used in numerous applications, such as in telecom isolators, circulators, or interleavers, and/or in consumer applications, such as optical low pass filters, for example.

Although embodiments of optical retarders have been described that include foam birefringent layers that have a rectangular grating profile, other embodiments are also possible. For example, in some embodiments, the grating profile of a form birefringent layer can be curved, such as having a sinusoidal shape. In another example, the grating can have a triangular or sawtooth profile.

Furthermore, while the grating period in the form birefringent layers of optical retarders has been described as constant, in certain embodiments the grating period may vary. In some embodiments, portions of form birefringent layers can be non-periodically arranged.

Optical retarders such as those described herein can be incorporated into optical devices, including passive optical devices (e.g., polarizers) and active optical devices (e.g., liquid crystal displays). Optical retarders can be integrated into the device, providing a monolithic device, or can be arranged separately from other components of the device.

Figure 7:
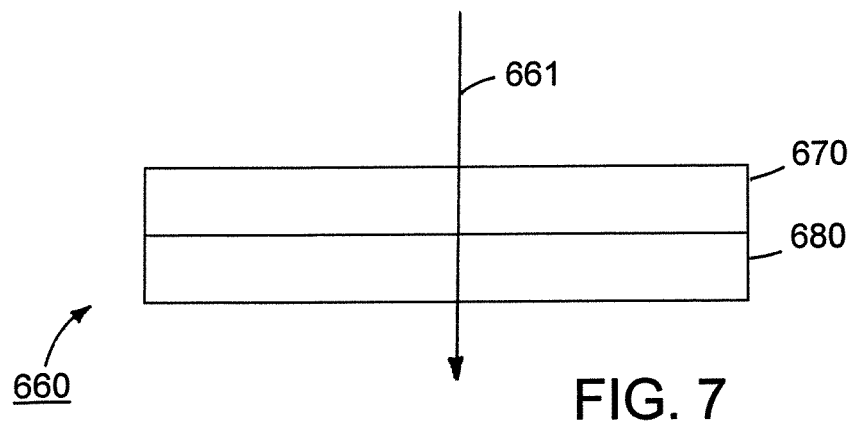
FIG. 7 is a cross-sectional view of a polarizer incorporating an optical retarder.

Referring to FIG. 7, an example of a passive optical device incorporating an optical retarder is a polarizer 660. Polarizer 660 includes a polarizing film 670 and an optical retarder 680. Polarizing film 670 can be a sheet polarizer (e.g., iodine-stained polyvinyl alcohol) or a nano-structured polarizer, such as is disclosed in U.S. patent Ser. No. 10/644,643, entitled "MULTILAYER STRUCTURES FOR POLARIZATION AND BEAM CONTROL," and PCT Patent Application Serial No. PCT/US03/26024, entitled "METHOD AND SYSTEM FOR PROVIDING BEAM FOR POLARIZATION," the contents both of which are hereby incorporated by reference in their entirety.

Polarizing film 670 linearly polarizes light incident on polarizer 660 propagating along axis 661. Optical retarder 680 then retards the linearly polarized light, providing polarized light with a desired ellipticity exiting polarizer 660. The ellipticity of the exiting light can vary as desired by choosing the parameters associated with the retardation layer of optical retarder 680 to provide a desired amount of retardation. For example, the exiting light can be circularly polarized or elliptically polarized.

Figure 8:
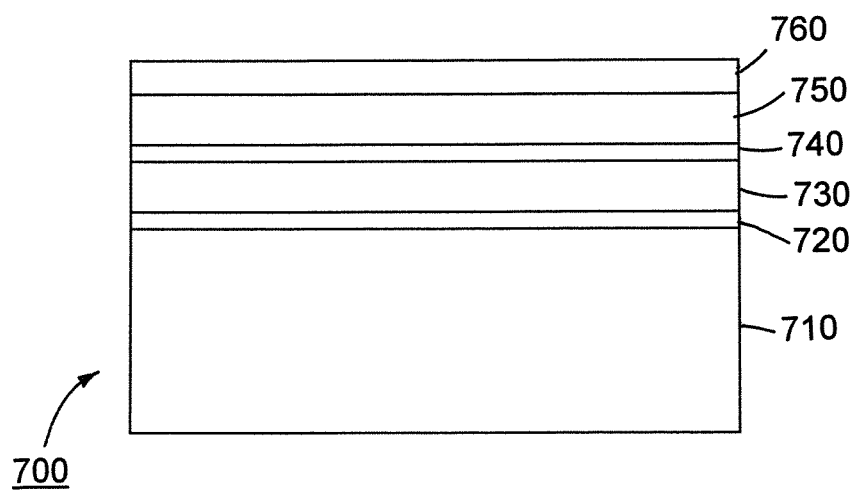
FIG. 8 is a cross-sectional view of a liquid crystal display incorporating an optical retarder.

Referring to FIG. 8, an example of an active optical device incorporating an optical retarder is a liquid crystal display 700, which includes a substrate 710 (e.g., a silicon substrate), a reflective electrode 720, a layer 730 of a liquid crystal (e.g., a nematic or ferroelectric liquid crystal), a transparent electrode 740 (e.g., formed from indium tin oxide), an optical retarder 750, and a polarizing film 760. Optical retarder 750 retards polarized light transmitted through polarizing film 760. This light reflects, from electrode 720, propagating through liquid crystal layer 730 twice. The reflected light is again retarded by optical retarder 760 before impinging on polarizing film 760 a second time. Depending on the voltage applied across electrodes 720 and 740, the reflected light is either absorbed or transmitted by polarizing film 760, corresponding to a dark or bright pixel, respectively. Optionally, LCD 700 includes color filters that absorb certain wavelengths in the visible spectrum providing a colored image. While LCD 700 is a reflective display, the optical retarders disclosed herein can be used in other types of display, such as transmissive displays or transflective displays.

The following examples are illustrative and not intended as limiting.

EXAMPLES

Optical retarders were prepared as follows. A 0.5 mm thick BK7 wafer (four inches in diameter), obtained from Abrisa Corporation (Santa Paula, Calif.), was cleaned by removing insoluble organic contaminants with a $H_2O:H_2O_2:NH_4OH$ solution, and removing ionic and heavy metal atomic contaminants using a $H_2O:H_2O_2:HCl$ solution. Thereafter, the wafer was rinsed with isopropyl alcohol and deionized water, and spin dried.

A sub-wavelength grating was etched into the BK7 wafer as follows. The BK7 wafer was spin coated with a thin layer (~180 nm) of PMMA (molecular weight of 15K purchased from Sigma-Aldrich, St. Louis, Mo.), which was baked on a hot plate at about 115° C. for about one hour. After baking, the resist was imprinted with a grating mold having a period of 200 nm and depth of about 110 nm, and a grating linewidth of about 100 nm. The mold included a patterned $SiO_2$ layer (about 200 nm thick) on a 0.5 mm thick silicon substrate. The mold was prepared using methods disclosed by J. Wang, Z. Yu, and S. Y. Chou, in *J. Vac. Sci. Technol.*, B17, 2957 (1999). After imprinting, the deformed UV curable resist was fully cured by exposing to UV light through the BK7, substrate side. The mold was then separated from the resist, leaving a mask with a negative pattern of the mold profile. The mask was etched by $O_2$ RIE until the BK7 wafer was exposed in the recessed portions of the mask. This etch was performed using a plasma-therm 790 (available from Unaxis, Inc., St. Petersburg, Fla.). The pressure during etching was 4 mtorr. The power was set to 70 W and the oxygen flow rate during the etching was 10 sccm. The total thickness of resist etched to expose the BK7 wafer was about 120 nm.

After etching the mask, about 50 nm of Cr was deposited on the remaining resist/exposed BK7 wafer by e-beam evaporation at high vacuum (i.e., less than about $5\times10^{-6}$ torr) at an oblique angle from the wafer normal. The oblique angle was about 65 degrees. Cr was deposited on the top and sidewall of the remaining mask lines, providing a hard mask for etching of BK7. After Cr deposition, $O_2$ RIE was used again to etch any exposed resist that was not covered by the Cr. $CHF_3$ RIE was then used to etch exposed portions of the BK7 wafer surface to form a subwavelength grating in the wafer. The BK7 was etched using a plasma-term 720. The chamber pressure was about 5 mtorr, the power was about 100 W, and flow rate of 10 sccm and 1 sccm of $CHF_3$ and $O_2$ were used, respectively. 100 nm wide trenches having a depth of about 630 nm were etched into the BK7 wafer. After etching the BK7, the Cr was removed by immersing the wafer into CR-7 Cr etchant (obtained from Cyantek, Fremont, Calif.) for about 30 minutes. Residual resist was subsequently removed by $O_2$ RIE.

The trenches were filled with a nanolaminate material composed of $TiO_2$ and $SiO_2$. The nanolaminate material was deposited by ALD, which was performed using a P-400A ALD apparatus, obtained from Planar Systems, Inc. (Beaverton, Oreg.). Prior to depositing the nanolaminate, the etched wafer was heated to 300° C. inside the ALD chamber for about three hours. The chamber was flushed with nitrogen gas, flowed at about 2 SLM, maintaining the chamber pressure at about 0.75 Torr. The $TiO_2$ precursor was Ti-ethaoxide, which was heated to about 140° C. The $SiO_2$ precursor was silanol, heated to about 110° C. For both precursors, the reagent used was water, which was maintained at about 13° C. The Ti-ethaoxide and silanol were 99.999% grade purity, obtained from Sigma-Aldrich (St. Louis, Mo.). The nanolaminate was formed by repeating a cycle in which 10 monolayers of $TiO_2$ were deposited, followed by a single monolayer of $SiO_2$. To deposit a $TiO_2$ monolayer, water was introduced to the chamber for two seconds, followed by a two second nitrogen purge. Then Ti-ethaoxide was introduced to the chamber, followed by another two second nitrogen purge. $SiO_2$ monolayers were deposited by introducing water to the ALD chamber for one second, followed by a two second nitrogen purge. Silanol was then introduced for one second.

The chamber was then purged for three seconds with nitrogen before the next pulse of reagent. The refractive index of the nanolaminate was estimated to be approximately 1.88 at 632 nm, as determined from measurements of a nanolaminate film similarly prepared on a flat glass substrate.

The retardation of an optical retarder was measured using an M-2000V® Spectroscopic Ellipsometer (commercially available from J. A. Woollam Co., Inc., Lincoln, Nebr.) to be 23.85 nm at a wavelength of 551 nm.

Figure 9A:
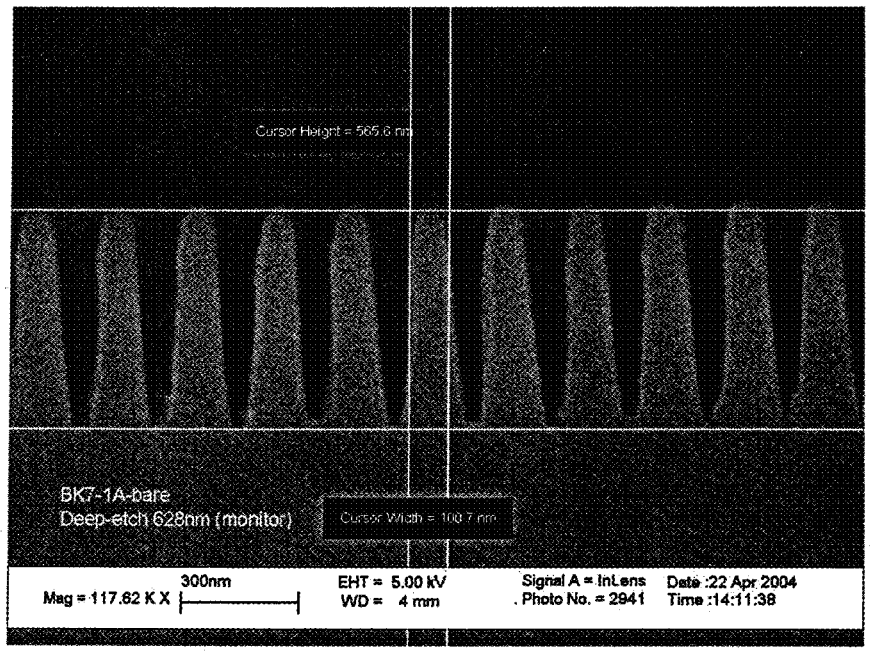
FIG. 9A is a scanning electron micrograph of a sub-wavelength grating prior to trench filling.
Figure 9B:
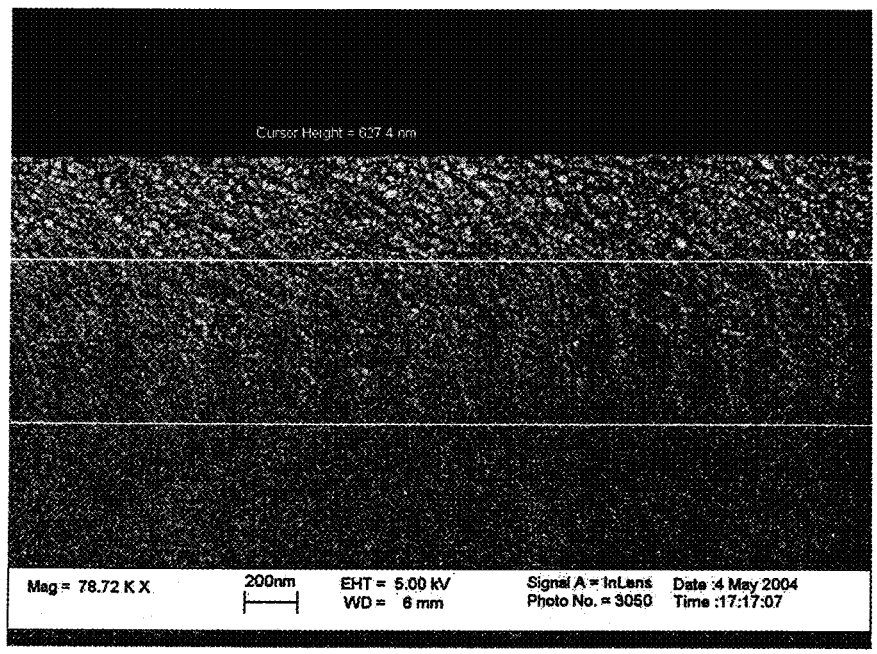
FIG. 9B is a scanning electron micrograph of the sub-wavelength grating shown in FIG. 9A after trench filling.

Unfilled and filled gratings were studied using scanning electron microscopy, which was performed using a LEO thermo-emission scanning electron microscope. To perform this study, a sample was cleaved and coated with a thin layer of Au. The cross section of the cleaved interface was then viewed. FIGS. 9A and 9B show SEM micrographs of a grating prior to and after trench filling, respectively.

Other embodiments are in the following claims.

What is claimed is:

1. An optical retarder having a retardation film comprising:
    a grating having a period of less than $0.5\lambda$, where $\lambda$ is between 400 and 700 nm, inclusive;
    a grating material having an index of refraction of $n_g$ at $\lambda$;
    a fill material disposed by atomic layer deposition between and conformally coating adjacent lines of the grating material, the fill material having an index of refraction $n_f$ at $\lambda$, and $n_g$ differs from $n_f$ by more than zero but less than 1;
    wherein at least one trench in which the fill material is disposed is at least 90% filled; and
    the period, grating material and fill material chosen such that the film is form birefringent at $\lambda$.

2. The retarder of claim 1, wherein the fill material in the trench contains a nanolaminate.

3. The retarder of claim 1, wherein the fill material has a layer that comprises a material selected from the group consisting of $SiO_2$, $SiNx$, $Si$, $Al_2O_3$, $ZrO_2$, $Ta_2O_5$, $TiO_2$, $HfO_2$, $Nb_2O_5$, and $MgF_2$.

4. The retarder of claim 1, wherein the fill material has a first layer that comprises a first material selected from the group consisting of $SiO_2$, $SiNx$, $Si$, $Al_2O_3$, $ZrO_2$, $Ta_2O_5$, $TiO_2$, $HfO_2$, $Nb_2O_5$, and $MgF_2$, and a second layer having a different composition from the first layer.

5. The retarder of claim 1, wherein the fill material has at least one layer derived in situ from a precursor, the layer comprising a composition selected from the group consisting of $SiO_2$, $SiNx$, $Si$, $Al_2O_3$, $ZrO_2$, $Ta_2O_5$, $TiO_2$, $HfO_2$, $Nb_2O_5$, and $MgF_2$.

6. The retarder of claim 1, wherein the fill material has a refractive index of at least 1.3 at $\lambda$.

7. The retarder of claim 1, wherein the fill material has a refractive index of at least 1.6 at $\lambda$.

8. The retarder of claim 1, wherein the fill material has a refractive index of at least 2.0 at $\lambda$.

9. The retarder of claim 1, wherein the grating material is selected from the group consisting of $SiO_2$, $SiNx$, $Si$, $Al_2O_3$, $ZrO_2$, $Ta_2O_5$, $TiO_2$, $HfO_2$, $Nb_2O_5$, and $MgF_2$.

10. The retarder of claim 1, wherein the grating material comprises a glass.

11. The retarder of claim 1, wherein the grating material comprises a polymer.

12. The retarder of claim 1, wherein the grating material comprises a semiconductor.

13. The retarder of claim 1, wherein retarder has an optical retardation of at least 5 nm for light of wavelength $\lambda$ propagating through the retarder.

14. The retarder of claim 1, wherein retarder has an optical retardation of at least 10 nm for light of wavelength $\lambda$ propagating through the retarder.

15. The retarder of claim 1, wherein retarder has an optical retardation of at least 20 nm for light of wavelength $\lambda$ propagating through the retarder.

16. The retarder of claim 1, wherein retarder has an optical retardation of at least 50 nm for light of wavelength $\lambda$ propagating through the retarder.

17. The retarder of claim 1, wherein the at least one trench has a depth of at least 10 nm.

18. An optical retarder having a retardation film comprising:
    a grating having a period of less than $0.5\lambda$, where $\lambda$ is between 150 and 2000 nm, inclusive;
    a grating material having an index of refraction of $n_g$ at $\lambda$;
    a fill material disposed by atomic layer deposition between and conformally coating adjacent lines of the grating material, the fill material having an index of refraction $n_f$ at $\lambda$, and $n_g$ differs from of by more than zero but less than 1;
    wherein at least one trench in which the fill material is disposed is at least 90% filled; and
    the period, grating material and fill material chosen such that the film is form birefringent at $\lambda$.

19. The retarder of claim 1, wherein the at least one trench in which the fill material is disposed is at least 90% filled and less than 100% filled.

20. The retarder of claim 1, wherein the at least one trench in which the fill material is disposed is 100% filled.

* * * * *